United States Patent
Wu et al.

(10) Patent No.: US 11,394,511 B2
(45) Date of Patent: Jul. 19, 2022

(54) TRANSMISSION METHOD FOR CONFIGURATION INFORMATION, AND RELEVANT DEVICE

(71) Applicant: VIVO MOBILE COMMUNICATION CO., LTD., Guangdong (CN)

(72) Inventors: Yumin Wu, Chang'an Dongguan (CN); Yanxia Zhang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 78 days.

(21) Appl. No.: 16/958,576

(22) PCT Filed: Nov. 23, 2018

(86) PCT No.: PCT/CN2018/117152
§ 371 (c)(1),
(2) Date: Jun. 26, 2020

(87) PCT Pub. No.: WO2019/128581
PCT Pub. Date: Jul. 4, 2019

(65) Prior Publication Data
US 2021/0067299 A1 Mar. 4, 2021

(30) Foreign Application Priority Data
Dec. 29, 2017 (CN) .......................... 201711476223.5

(51) Int. Cl.
*H04L 5/00* (2006.01)
*H04W 36/00* (2009.01)
(Continued)

(52) U.S. Cl.
CPC .......... *H04L 5/0053* (2013.01); *H04W 24/10* (2013.01); *H04W 36/0069* (2018.08); *H04W 76/15* (2018.02)

(58) Field of Classification Search
CPC .... H04L 5/0053; H04W 24/10; H04W 88/06; H04W 24/20; H04W 36/0069; H04W 76/15; H04B 15/00
See application file for complete search history.

(56) References Cited

U.S. PATENT DOCUMENTS

2012/0231148 A1    9/2012  Ganapathi et al.
2013/0242833 A1*   9/2013  Ahn ................. H04W 74/0833
                                                      370/311
(Continued)

FOREIGN PATENT DOCUMENTS

CN    103201967 A    7/2013
CN    105960808 A    9/2016
(Continued)

OTHER PUBLICATIONS

"3rd Generation Partnership Project; Technical Specification Group Radio Access Network; Study on New Radio Access Technology; Radio Access Architecture and Interfaces" (Release 14) 3GPP TR 38.801 v1.2.0 (Feb. 2017).
(Continued)

*Primary Examiner* — Diane L Lo
*Assistant Examiner* — Abusayeed M Haque
(74) *Attorney, Agent, or Firm* — Maschoff Brennan

(57) ABSTRACT

A method of transmitting configuration information and a related device are provided. The method includes sending IDC assistance information to a network-side device, wherein the network-side device includes at least one of an MN and an SN; receiving assistance configuration information of IDC interference cancellation sent by the network-side device, wherein the assistance configuration information of IDC interference cancellation corresponds to the IDC assistance information.

14 Claims, 10 Drawing Sheets

(51) Int. Cl.
*H04W 88/06* (2009.01)
*H04W 76/15* (2018.01)
*H04W 24/10* (2009.01)

(56) References Cited

U.S. PATENT DOCUMENTS

| | | |
|---|---|---|
| 2013/0324172 A1 | 12/2013 | Ahn et al. |
| 2015/0319731 A1* | 11/2015 | Cui .................... G01S 5/10 |
| | | 455/456.1 |
| 2015/0327280 A1 | 11/2015 | Zhang et al. |
| 2016/0380779 A1* | 12/2016 | Sharma ............ H04L 63/1466 |
| | | 370/312 |
| 2017/0245199 A1 | 8/2017 | Lee et al. |
| 2017/0303329 A1 | 10/2017 | Lee et al. |
| 2018/0263048 A1* | 9/2018 | Ingale ............... H04W 72/1215 |
| 2020/0125455 A1* | 4/2020 | Neelakanteshwar ....................... |
| | | G06F 11/1464 |
| 2020/0125542 A1* | 4/2020 | Purushothaman .... G06F 16/211 |
| 2020/0145889 A1* | 5/2020 | Yamada .......... H04W 36/00837 |
| 2021/0067299 A1* | 3/2021 | Wu ...................... H04L 5/0053 |
| 2021/0084031 A1* | 3/2021 | Lao .................... H04L 67/1095 |
| 2021/0160231 A1* | 5/2021 | Kumar .................. H04L 63/083 |
| 2021/0315026 A1* | 10/2021 | Jung ................ H04W 74/0808 |

FOREIGN PATENT DOCUMENTS

| | | | |
|---|---|---|---|
| CN | 106060866 A | * 10/2016 | ............ H04W 24/08 |
| CN | 106060866 A | * 10/2016 | ........... H04B 17/345 |
| CN | 106664734 A | 5/2017 | |
| CN | 106688298 A | 5/2017 | |
| WO | 2017/048024 A1 | 3/2017 | |

OTHER PUBLICATIONS

Wenjia et al., "Research on Solution to Terminal Implementation for 5G NR Networking Mode" Jul. 4, 2017.
Marzban et al., "IDC Interference-Aware Resource Allocation for LTE/WLAN Heterogeneous Networks" IEEE, Aug. 12, 2015.
EP Search Report in Application No. 18896459.7 dated Nov. 19, 2020.
CN Office Action in Application No. 201711476223.5 dated Apr. 29, 2020.
Written Opinion in Application No. PCT/CN2018/117152 dated Jul. 9, 2020.

* cited by examiner

TRANSMISSION METHOD FOR CONFIGURATION INFORMATION, AND RELEVANT DEVICE

CROSS-REFERENCE TO RELATED APPLICATION

This application is a U.S. national phase application of a PCT Application No. PCT/CN2018/117152 filed on Nov. 23, 2018, which claims a priority to Chinese Patent Application No. 201711476223.5 filed in China on Dec. 29, 2017, the disclosures of which are incorporated in their entirety by reference herein.

TECHNICAL FIELD

The present disclosure relates to the field of communication technology, and more particularly, relates to a method for transmitting configuration information and a relevant device.

BACKGROUND

In-Device Coexistence (IDC) means that a user terminal supports a plurality of different wireless transceivers, such as a Long Term Evolution (LTE) wireless transceiver, a Fifth Generation (5G) wireless transceiver, a Wireless-Fidelity (WIFI) wireless transceiver, a Bluetooth wireless transceiver, a Global Navigation Satellite System (GNSS) wireless transceiver, and the like. In this way, a wireless transceiver of a user terminal on a resource may be subjected to interference from one or more other wireless transceivers. Such interference may be from the same or different Radio Access Technology (RAT), and the interference may be referred to as an IDC interference. In addition, a Multi-Connectivity (MC) scenario is introduced in a 5G communication system, and a Master Node (MN) and a Secondary Node (SN) in the MC scenario may adopt the same or different wireless technology. It can be seen that how to reduce the IDC interference of a user terminal in an MC technology scenario is an urgent technical problem to be solved.

SUMMARY

A method of transmitting configuration information is provided. The method is applied to a user terminal. The method includes sending In-Device Coexistence (IDC) assistance information to a network-side device, wherein the network-side device includes at least one of a master node (MN) and a secondary node (SN); receiving assistance configuration information of IDC interference cancellation sent by the network-side device, wherein the assistance configuration information of IDC interference cancellation corresponds to the IDC assistance information.

In a first aspect, some embodiments of the present disclosure further provide a method of transmitting configuration information. The method is applied to a user terminal. The method includes sending In-Device Coexistence (IDC) assistance information to a network-side device, wherein the network-side device includes at least one of an MN and an SN; receiving assistance configuration information of IDC interference cancellation sent by the network-side device, wherein the assistance configuration information of IDC interference cancellation corresponds to the IDC assistance information.

In a second aspect, some embodiments of the present disclosure provide a method of transmitting configuration information. The method is applied to an MN. The method includes receiving IDC assistance information sent by a user terminal; sending assistance configuration information of IDC interference cancellation to the user terminal, wherein the assistance configuration information of IDC interference cancellation corresponds to the IDC assistance information.

In a third aspect, some embodiments of the present disclosure provide a method of transmitting configuration information. The method is applied to an SN. The method includes obtaining IDC assistance information of a user terminal; sending assistance configuration information of IDC interference cancellation to the user terminal or a MN, wherein the assistance configuration information of IDC interference cancellation corresponds to the IDC assistance information.

In a fourth aspect, some embodiments of the present disclosure provide a user terminal. The user terminal includes a first sending module, used to send IDC assistance information to a network-side device, wherein the network-side device includes at least one of an MN and an SN; a first receiving module, used to receive assistance configuration information of IDC interference cancellation sent by the network-side device, wherein the assistance configuration information of IDC interference cancellation corresponds to the IDC assistance information.

In a fifth aspect, some embodiments of the present disclosure provide an MN. The MN includes a first receiving module, used to receive IDC assistance information sent by a user terminal; a first sending module, used to send assistance configuration information of IDC interference cancellation to the user terminal, wherein the assistance configuration information of IDC interference cancellation corresponds to the IDC assistance information.

In a sixth aspect, some embodiments of the present disclosure provide an SN. The SN includes an obtaining module, used to obtain In-Device Coexistence (IDC) assistance information of a user terminal; a sending module, used to send assistance configuration information of IDC interference cancellation to the user terminal or an MN, wherein the assistance configuration information of IDC interference cancellation corresponds to the IDC assistance information.

In a seventh aspect, some embodiments of the present disclosure provide a user terminal. The user terminal includes a storage, a processor, and a computer program stored on the storage and executable by the processor, wherein when the processor executes the computer program, the processor implements steps in the method of transmitting configuration information at the user terminal side.

In an eighth aspect, some embodiments of the present disclosure provide an MN. The MN includes a storage, a processor, and a computer program stored on the storage and executable by the processor, wherein when the processor executes the computer program, the processor implements steps in the method of transmitting configuration information at the MN side.

In a ninth aspect, some embodiments of the present disclosure provide an SN. The SN includes a storage, a processor, and a computer program stored on the storage and executable by the processor, wherein when the processor executes the computer program, the processor implements steps in the method of transmitting configuration information at the SN side.

In a tenth aspect, some embodiments of the present disclosure provide a computer readable storage medium. The computer readable storage medium includes a computer program stored on the computer readable storage medium, wherein when a processor executes the computer program, the processor implements steps in the method of transmitting configuration information at the user terminal side; or when a processor executes the computer program, the processor implements steps in the method of transmitting configuration information at the MN side; or when a processor executes the computer program, the processor implements steps in the method of transmitting configuration information at the SN side.

DETAILED DESCRIPTION

Technical solutions in the embodiments of the present disclosure will be clearly and completely described below in conjunction with the accompanying drawings in the embodiments of the present disclosure. It is apparent that the described embodiments are a part, rather than all, of the embodiments of the present disclosure. Based on the embodiments of the present disclosure, all other embodiments obtained by those of ordinary skill in the art without paying creative labor are within the protection scope of the present disclosure.

Figure 1:
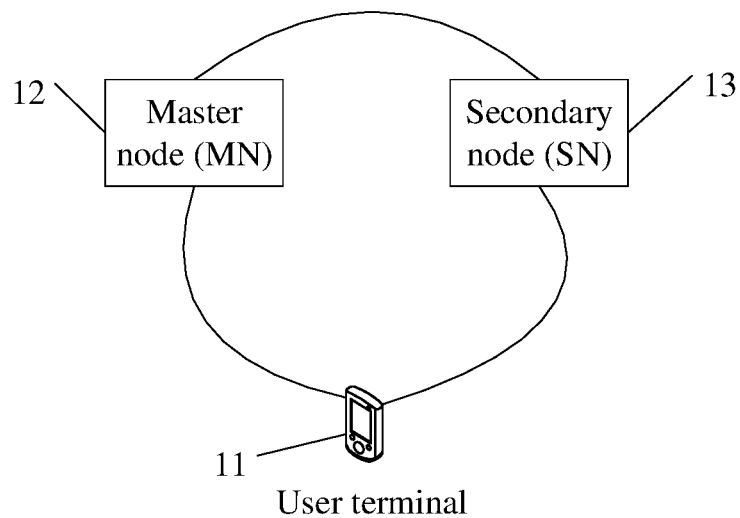
FIG. 1 is a structural diagram of a system of transmitting configuration information provided by some embodiments of the present disclosure.

Referring to FIG. 1, FIG. 1 is a structural diagram of a system of transmitting configuration information provided by some embodiments of the present disclosure. As shown in FIG. 1, the system includes a user terminal 11, an MN 12, and an SN 13, wherein the user terminal 11 may be a UE (User Equipment), for example, a terminal-side device such as a mobile phone, a Tablet Personal Computer, a Laptop Computer, a personal digital assistant (PDA), a Mobile Internet Device (MID), or a Wearable Device. It should be noted that in the embodiments of the present disclosure, a specific type of the user terminal 11 is not limited. The user terminal 11 may establish a connection with the MN 12 and the SN 13, and the MN 12 and the SN 13 may use the same or different wireless technologies, for example, the MN 12 is a 5G base station (e.g. gNB, 5G NR NB), whereas the SN 13 may be a 4G base station (e.g., eNB) or a 5G base station. It should be noted that specific types of the MN 12 and the SN 13 are not limited in the embodiments of the present disclosure. Accordingly, two cell groups, i.e., a Master Cell Group (MCG) and a Secondary Cell Group (SCG), may be included in the MC scenario. The Master Cell Group may include a Primary Cell (PCell) and one or more Secondary Cells (SCell), and the Secondary Cell Group may include a Primary Secondary Cell (PSCell), and one or more SCells.

In a control plane architecture, a Signaling Radio Bearer (SRB) 0, an SRB1, and an SRB2 may be established between the user terminal 11 and the MN 12. An SRB3 may or may not be established between the user terminal 11 and the SN 13; in a user plane architecture, the user terminal 11 may configure different bearer types on the MN and the SN for data transmission. For example, the bearer types may include an MCG Bearer, an MCG Split Bearer, an SCG Bearer, and an SCG Split Bearer, etc. The embodiments of the present disclosure are not limited thereto.

Figure 2:
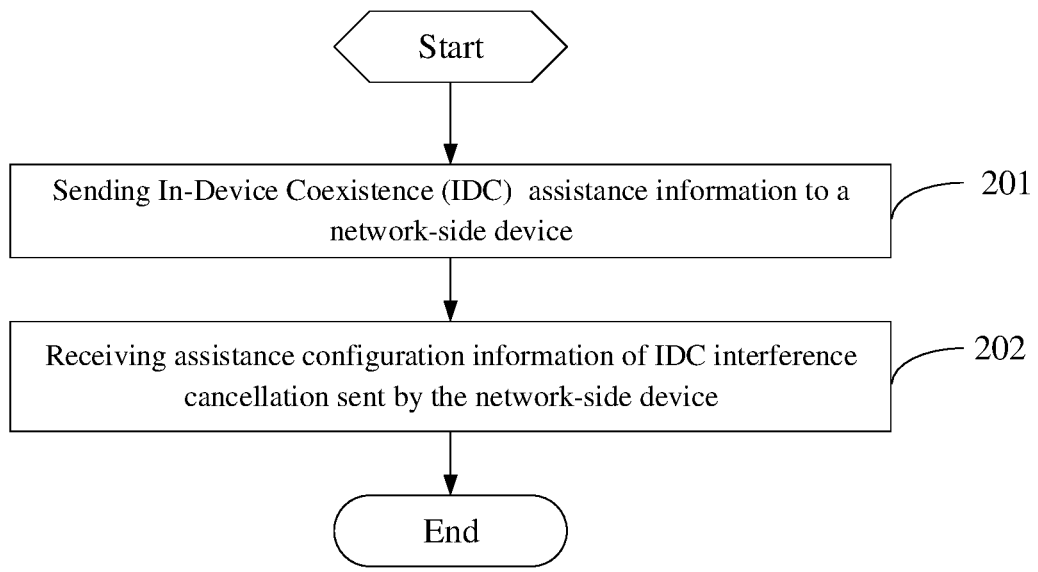
FIG. 2 is a flowchart of a method of transmitting configuration information provided by some embodiments of the present disclosure.

Referring to FIG. 2, FIG. 2 is a flowchart of a method of transmitting configuration information provided by some embodiments of the present disclosure. The method is applied to a user terminal, as shown in FIG. 2, the method includes the following steps 201-202.

Step 201: sending IDC assistance information to a network-side device, wherein the network-side device includes at least one of an MN and an SN.

Sending the IDC assistance information to the network-side device may be sending the IDC assistance information to at least one of the MN and the SN, wherein, the IDC assistance information may be information for assisting at least one of the MN and the SN in configuring assistance configuration information of an IDC interference cancellation. After the MN and/or the SN receives the assistance information, the MN and/or the SN may configure the assistance configuration information of IDC interference cancellation corresponding to the assistance information.

For example, the IDC assistance information may include at least one of time-domain assistance information, frequency-domain assistance information, space-domain assistance information, an interfered radio technology type, and the like.

Further, the time-domain assistance information includes, but is not limited to, at least one of following: frequency-domain information in which the time-domain assistance information acts, space-domain information in which the time-domain assistance information acts, configuration information of downlink discontinuous reception to which a user terminal prefers, bitmap information of downlink reception to which a user terminal prefers, configuration information of uplink discontinuous transmission to which the user terminal prefers, bitmap information of uplink transmission to which a user terminal prefers, and the like. The frequency-domain assistance information includes, but is not limited to, at least one of following: frequency-domain identification information of a frequency subject to interference, frequency-domain identification information of an interference source, and the like. The space-domain assistance information includes, but is not limited to, at least one of following: space-domain identification information of a frequency subject to interference, space-domain identification information of an interference source, and the like. The frequency-domain information or the frequency-domain identification information described above includes, but is not limited to, at least one of following: a frequency identification, a bandwidth range, a bandwidth part (Bandwidth Part, BWP) identifier, a cell identifier, a cell group identifier, and the like. The space-domain information or the space-domain identification information described above includes, but is not limited to, at least one of following: a beam identifier, a beam pair identifier, a Synchronization Signal Block (SSB) identifier, a Channel State Information Reference Signal (CSI-RS) identifier, and a Quasi Co-Location (QCL) identifier. The above-mentioned interfered radio technology types include, but are not limited to, at least one of following: a 2G technology identifier, a 3G technology identifier, a 4G technology identifier, a 5G technology identifier, and the like.

Step 202: receiving the assistance configuration information of IDC interference cancellation sent by the network-side device, wherein the assistance configuration information of IDC interference cancellation corresponds to the IDC assistance information.

Correspondence between the assistance configuration information of IDC interference cancellation and the IDC assistance information may be correspondence in which at least one of the MN and the SN configures the assistance configuration information of IDC interference cancellation for a user terminal according to the IDC assistance information, for example, the MN or the SN identifies resources (e.g., time-domain resources, frequency-domain resources, or space-domain resources), subject to IDC interference, of a user terminal, or identifies radio technology type, subject to IDC interference, or identifies transmission and reception resources preferred by the user terminal, through the IDC assistance information. The MN or the SN configures corresponding assistance configuration information of IDC interference cancellation for a user terminal for a purpose of reducing or eliminating the IDC interference. If uplink transmission or downlink reception of resources subject to the IDC interference is used to be stopped, or uplink transmission or downlink reception of transmission and reception resources preferred by the user terminal. A configuration process of the assistance configuration information of IDC interference cancellation is not limited in some embodiments of the present disclosure.

The assistance configuration information of IDC interference cancellation described above may be assistance configuration information for eliminating or reducing IDC interference. Thus, by configuring the assistance configuration information of IDC interference cancellation, the user terminal can reduce or eliminate the IDC interference, thereby improving reliability and throughput of transmitting and receiving data by the user terminal. For example, the user terminal performs, according to the assistance configuration information of IDC interference cancellation, corresponding interference processing operations such as stopping uplink transmission and/or stopping downlink reception. Further, the assistance configuration information of IDC interference cancellation may be configuration information of stopping uplink transmission of a certain resource or configuration information of stopping downlink reception of a certain resource, or may also be configuration information for reducing a transmission power of an uplink transmission of a certain resource, or may also be the number of uplink transmission subframes (autonomous Denial sub-frames) allowed to be ignored by the user terminal, or a duration of uplink transmission (autonomous Denial Validity) allowed to be ignored by the user terminal, or the like, thereby the user terminal performs a corresponding interference processing operation to reduce or eliminate IDC interference. For example, when interference occurs, uplink transmission may be ignored within a duration of uplink transmission allowed to be ignored by the user terminal, and the number of subframes in which the uplink transmission is ignored is less than or equal to the number of uplink transmission subframes allowed to be ignored by the UE.

It should be noted that both the IDC assistance information and the assistance configuration information of IDC interference cancellation may be sent through a control plane signaling, thereby ensuring transmission performance of the IDC assistance information and the assistance configuration information of IDC interference cancellation.

Through the above steps, the network-side device can configure the assistance configuration information of IDC interference cancellation for a user terminal, thereby enable the user terminal to reduce or eliminate IDC interference, Further, reliability and throughput of transmitting and receiving data by the user terminal are improved.

It should be noted that the above method may be applied to a 5G system, but is not limited thereto, for example, it may also be applied to a future 6G system or the like.

In an embodiment of the present disclosure, the IDC assistance information is sent to a network-side device, wherein, the network-side device includes at least one of an MN and an SN, and assistance configuration information of IDC interference cancellation sent by the network-side device is received, wherein, the assistance configuration information of IDC interference cancellation corresponds to the IDC assistance information. Since the user terminal can acquire the assistance configuration information of IDC interference cancellation sent by the network-side device, the IDC interference in the user terminal can be reduced.

Figure 3:
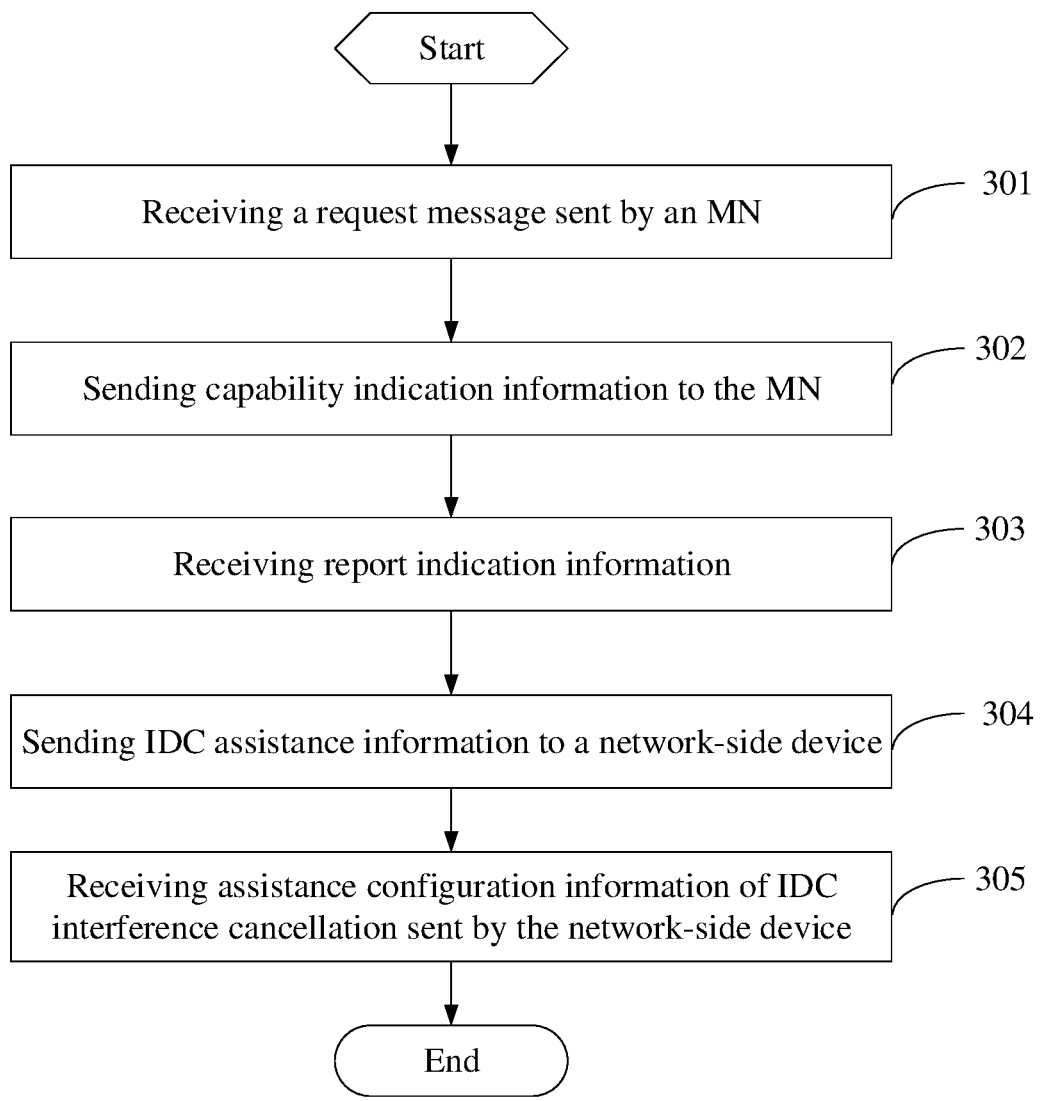
FIG. 3 is a flowchart of another method of transmitting configuration information provided by some embodiments of the present disclosure.

Referring to FIG. 3, FIG. 3 is a flowchart of another method of transmitting configuration information provided in some embodiments of the present disclosure, and the method is applied to a user terminal, as shown in FIG. 3, the method includes the following steps 301-305.

Step 301: receiving a request message sent by an MN, wherein the request message is used to request the user terminal to report capability indication information.

The request message may be sent through an SRB between the user terminal and the MN to request the user terminal to report capability indication information to the MN.

Step 302: sending capability indication information to the MN, wherein the capability indication information is used to indicate whether the user terminal supports an IDC assistance function.

After the user terminal receives the request message, the user terminal may send, to the MN, the capability indication information indicating whether the user terminal supports the IDC assistance function, to inform the MN whether the user terminal supports the IDC assistance function. The IDC assistance function may be a function capable of reducing or eliminating IDC interference through the assistance configuration information of IDC interference cancellation.

Step 303: receiving report indication information, wherein the report indication information is used to indicate whether the user terminal is allowed to report IDC assistance information.

The report indication information may be determined by the MN according to the capability indication information or by negotiation between the MN and the SN according to the capability indication information. In this way, the user terminal may or may not, through the above-mentioned report indication information, be allowed to report the IDC assistance information, thereby avoiding the user terminal from directly reporting the IDC assistance information, which may result in waste of transmission resources. Thus, an effect of saving transmission resources is achieved. For example, in some cases, the network side does not allow the user terminal to report, and the IDC assistance information reported in this case may be invalid, thus directly reporting the IDC assistance information by the user terminal is a waste of transmission resources.

As an optional embodiment, if an SRB is not established between the user terminal and the SN, the report indication information is sent by the MN. The report indication information is used to indicate whether at least one of the Master Cell Group (MCG) and the secondary cell group (SCG) allows the user terminal to report IDC assistance information.

This embodiment may be implemented under a condition that the SRB is not established between the user terminal and the SN. Thus, under the condition that the SRB is not established between the user terminal and the SN, the MN sends the report indication information to the user terminal, and may indicate whether the MCG allows the user terminal to report the IDC assistance information, and may also indicate whether the SCG allows the user terminal to report the IDC assistance information. In this way, the user terminal can report accordingly according to instructions of the MCG and the SCG, so that the network side can configure the user terminal to report the IDC assistance information through different SRBs, so as to improve flexibility of the IDC assistance information and accommodate different communication scenarios and service requirements.

In another optional embodiment, if an SRB is established between the user terminal and the SN, the report indication information includes at least one of first report indication information and second report indication information, wherein, the first report indication information is report indication information sent by the MN for indicating whether the MCG allows the user terminal to report the IDC assistance information, and the second report indication information is report indication information sent by the SN for indicating whether the SCG allows the user terminal to report the IDC assistance information.

This embodiment may be implemented under a condition that an SRB (for example, SRB3) is established between the user terminal and the SN. Thus, under this condition, the MN sends indication information for indicating whether the MCG allows the user terminal to report the IDC assistance information, and the SN sends indication information for indicating whether the SCG allows the user terminal to report IDC assistance information. Thus, the user terminal can report accordingly according to instructions of the MCG and the SCG.

It should be noted that, in the two optional embodiments, the MN may send, to the SN before the user terminal receives the report indication information, the capability indication information reported by the user terminal. The configuration information of the IDC assistance information is determined by the MN and the SN through transmission signaling, wherein, the configuration information of the IDC assistance information includes at least one of following: a measurement object identifier, a measurement configuration identifier, a measurement identifier, and the report indication information.

The measurement object identifier may be a measurement object for identifying one or more frequencies, and the measurement configuration identifier may be configuration for identifying one or more triggering measurements, and the measurement identifier may be an identifier for associating the measurement object identifier with the measurement configuration identifier. The report indication information is used to indicate whether at least one of the MCG and the SCG allows the user terminal to report the IDC assistance information.

In this way, the MN and the SN can negotiate and control the configuration information of the IDC assistance information reported by the user terminal, so as to improve performance of the configuration information of the IDC assistance information.

For example, the configuration information of the IDC assistance information is sent by the MN to the SN, and the SN sends or does not send a feedback message to the MN. The feedback message is used to indicate whether to accept the configuration information of the IDC assistance information, wherein a case that the SN does not send the feedback message means that the SN accepts the configuration information of the IDC assistance information. In this way, the MN can send the configuration information of the configured IDC assistance information to the SN for confirmation, and the SN can selectively feedback whether or not to accept the configuration information, and if the SN does not send the feedback message, then the SN accepts the configuration information.

As another example, the configuration information of the IDC assistance information is sent by the SN to the MN, and the MN sends or does not send a feedback message to the SN. The feedback message is used to indicate whether to accept the configuration information of the IDC assistance information, wherein a case that the MN does not send the feedback message means that the MN accepts the configuration information of the IDC assistance information. In this way, the SN can send the configuration information of the configured IDC assistance information to the MN for confirmation, and the MN can selectively feedback whether or not to accept the configuration information, and if the MN does not send the feedback message, then the MN accepts the configuration information.

Of course, the configuration information of the IDC assistance information configured by the MN or the SN can also be modified by a signaling between the MN and the SN until both the MN and the SN accept the configuration information, so as to improve performance of the configuration information of the IDC assistance information.

It should be noted that, in this embodiment, steps 301 to 303 are optional, and for example, it may also be implemented that the user terminal does not report the capability indication information to the MN.

Step 304: sending the IDC assistance information to a network-side device, wherein the network-side device includes at least one of an MN and an SN.

The IDC assistance information may include at least one of following: time-domain assistance information, frequency-domain assistance information, space-domain assistance information, an interfered radio technology type, and the like. The time-domain assistance information, the frequency-domain assistance information, the space-domain assistance information, and the interfered radio technology type may be time-domain assistance information, frequency-domain assistance information, space-domain assistance information and the interfered wireless technology type in a case that the user terminal is subject to the IDC interference.

Step 305: receiving the assistance configuration information of IDC interference cancellation sent by a network-side device, wherein the assistance configuration information of IDC interference cancellation corresponds to the IDC assistance information.

The assistance configuration information of IDC interference cancellation can be configuration information which enables the user terminal to reduce or eliminate the IDC interference. For example, the assistance configuration information of IDC interference cancellation includes, but is not limited to, at least one of following: time-domain information for stopping uplink transmission, frequency-domain information for stopping uplink transmission, space-domain information for stopping uplink transmission, an uplink channel type for stopping uplink transmission, time-domain information for stopping downlink transmission, frequency-domain information for stopping downlink transmission, space-domain information for stopping downlink transmission, and a downlink channel type for stopping downlink transmission. In this way, the user terminal can perform a corresponding interference processing operation through the assistance configuration information of IDC interference cancellation described above. For example, uplink transmission and/or the downlink reception are stopped on resources corresponding to the assistance configuration information of IDC interference cancellation, so as to reduce or eliminate the IDC interference.

As an optional embodiment, the network-side device is the MN, IDC assistance information includes at least one of IDC assistance information of the MCG and IDC assistance information of the SCG. The assistance configuration information includes at least one of the assistance configuration information of IDC interference cancellation of the MCG and the assistance configuration information of IDC interference cancellation of the SCG.

For example, if an SRB is not established between the user terminal and the SN, sending IDC assistance information to the network-side device may include sending the IDC assistance information to the MN, wherein, the IDC assistance information includes at least one of IDC assistance information of the MCG and IDC assistance information of the SCG.

In addition, the IDC assistance information of the MCG may be IDC assistance information sent by the user terminal to the MCG or the MN, and the IDC assistance information of the SCG may be IDC assistance information sent by the user terminal to the SCG or the SN, and the IDC assistance information of the MCG and the IDC assistance information of the SCG may be the same or different assistance information.

Thus, this embodiment may implement a case that the user terminal sends at least one of the IDC assistance information of the MCG and the IDC assistance information of the SCG to the MN without establishing an SRB between the user terminal and the SN.

In addition, in this embodiment, receiving the assistance configuration information of IDC interference cancellation sent by the network-side device may include receiving the assistance configuration information sent by the MN, wherein, the assistance configuration information includes at least one of following: the assistance configuration information of IDC interference cancellation of the MCG and the assistance configuration information of IDC interference cancellation of the SCG.

The assistance configuration information of IDC interference cancellation of the MCG may correspond to the IDC assistance information of the MCG, and the assistance configuration information of IDC interference cancellation of the SCG may correspond to the IDC assistance information of the SCG. Correspondence between the assistance configuration information of IDC interference cancellation of the MCG and the IDC assistance information of the MCG may be the assistance configuration information of IDC interference cancellation configured by the MN according to the IDC assistance information of the MCG, and when the MN configures the configuration information, the MN may also refer to the IDC assistance information of the SCG, or the assistance configuration information of IDC interference cancellation of the MCG may be configured by the SN, which is not limited thereto. Correspondence between the assistance configuration information of IDC interference cancellation of the SCG and the IDC assistance information of the SN may be implemented by sending, by the MN to the SN, at least one of the IDC assistance information of the MCG and the IDC assistance information of the SCG reported by the user terminal, and configuring the assistance configuration information of IDC interference cancellation according to the IDC assistance information of the SCG. Of course, when the SN configures the configuration information, the SN may also refer to the IDC assistance information of the MCG, or the assistance configuration information of IDC interference cancellation of the SCG may be configured by the MN, which is not limited thereto.

For example, the MN sends the IDC assistance information to the SN, and then the MN receives the assistance configuration information of IDC interference cancellation of the SCG sent by the SN. Thus, the assistance configuration information of IDC interference cancellation sent by the MN to the user terminal includes at least one of the assistance configuration information of IDC interference cancellation of the MCG and the assistance configuration information of IDC interference cancellation of the SCG.

Through the above steps, it may be implemented that the user terminal obtains at least one of the assistance configuration information of IDC interference cancellation of the MCG and the assistance configuration information of IDC interference cancellation of the SCG through the MN without establishing an SRB between the user terminal and the SN, thereby reducing or eliminating IDC interference imposed on at least one of the MCG and the SCG, or reducing or eliminating IDC interference generated by at least one of the MCG and the SCG.

In addition, in this embodiment, the MN may send the above-described assistance configuration information to the user terminal through an unused SRB, thereby making full use of SRBs in a communication system.

As another optional embodiment, an SRB is established between the user terminal and the SN. The network-side device includes at least one of the MN and the SN; the assistance configuration information includes at least one of following: the assistance configuration information of IDC interference cancellation of the MCG and the assistance configuration information of IDC interference cancellation of the SCG.

For example, sending the IDC assistance information to the network-side device may include sending the IDC assistance information of the MCG to at least one of the MN and the SN.

Sending the IDC assistance information of the MCG to the MN may be sending the IDC assistance information through SRB0, SRB1, or SRB2 between the user terminal and the MN. Sending the IDC assistance information of the SCG to the SN may be sending the IDC assistance information through an SRB3 between the user terminal and the SN to efficiently utilize each SRB.

In this way, in this embodiment, when the SRB is established between the user terminal and the SN, corresponding IDC assistance information can be sent to the MN and the SN, respectively. Thus, it is realized that the same or different IDC assistance information are reported for different cell groups, and the corresponding assistance configuration information of IDC interference cancellation are configured by the MN and the SN.

In addition, in this embodiment, the assistance configuration information including at least one of the assistance configuration information of IDC interference cancellation of the MCG and the assistance configuration information of IDC interference cancellation of the SCG may be understood as: receiving, by the user terminal, the assistance configuration information of IDC interference cancellation of the MCG sent by the MN and also receiving, by the user terminal, the assistance configuration information of IDC interference cancellation of the SCG sent by the SN; or, receiving, by the user terminal, the assistance configuration information of IDC interference cancellation of the MCG sent by the MN, or receiving, by the user terminal, the assistance configuration information of IDC interference cancellation of the SCG sent by the SN.

The assistance configuration information of IDC interference cancellation of the MCG may correspond to the IDC assistance information of the MCG, and the assistance configuration information of IDC interference cancellation of the SCG may correspond to the IDC assistance information of the SCG.

In this embodiment, if an SRB is established between the user terminal and the SN, the user terminal can acquire assistance configuration information of IDC interference cancellation of different cell groups. The user terminal may thus perform interference processing operations in different cell groups according to different pieces of assistance configuration information of IDC interference cancellation to reduce or eliminate IDC interference.

In addition, when an SRB is established between the user terminal and the SN, the MN may transmit the received IDC assistance information to the SN, or the SN transmits the received IDC assistance information to the MN. The assistance configuration information of IDC interference cancellation of the MCG may be configured by the MN according to at least one of the IDC assistance information of the MCG and the IDC assistance information of the SCG, and the assistance configuration information of IDC interference cancellation of the SCG may be configured by the SN according to at least one of the IDC assistance information of the SCG and the IDC assistance information of the MCG, so as to increase interaction between the MN and the SN, and further improve the performance of the assistance configuration information of IDC interference cancellation.

It should be noted that in the embodiments of the present disclosure, a SRB not established between the user terminal and the SN may be the SRB3 not established between the user terminal and the SN, or the user terminal is not configured with the SRB3; an SRB established between the user terminal and the SN may be the SRB3 established between the user terminal and the SN, or the user terminal is configured with the SRB3.

In addition, in the embodiments of the present disclosure, after the user terminal receives a message sent by the network side (MN or SN), the user terminal may return a corresponding confirmation message to the network side, in order to notify the network-side that the user terminal successfully receives the corresponding message.

In this embodiment, a plurality of optional embodiments are added on the basis of the embodiment shown in FIG. 2, and the IDC interference at the user terminal can be reduced or eliminated, and cases where the user terminal is configured with the SRB3 (an SRB between the user terminal and the SN) and is not configured with the SRB3 may also supported, the IDC assistance information in a case of interference are reported for different cell groups, and at the same time, the network side may send assistance configuration information for controlling interference cancellation in view of different cell groups and control plane signaling architectures, thereby IDC interference at the user terminal are reduced or eliminated, and further, reliability and throughput of transmitting and receiving data by the user terminal are improved.

Figure 4:
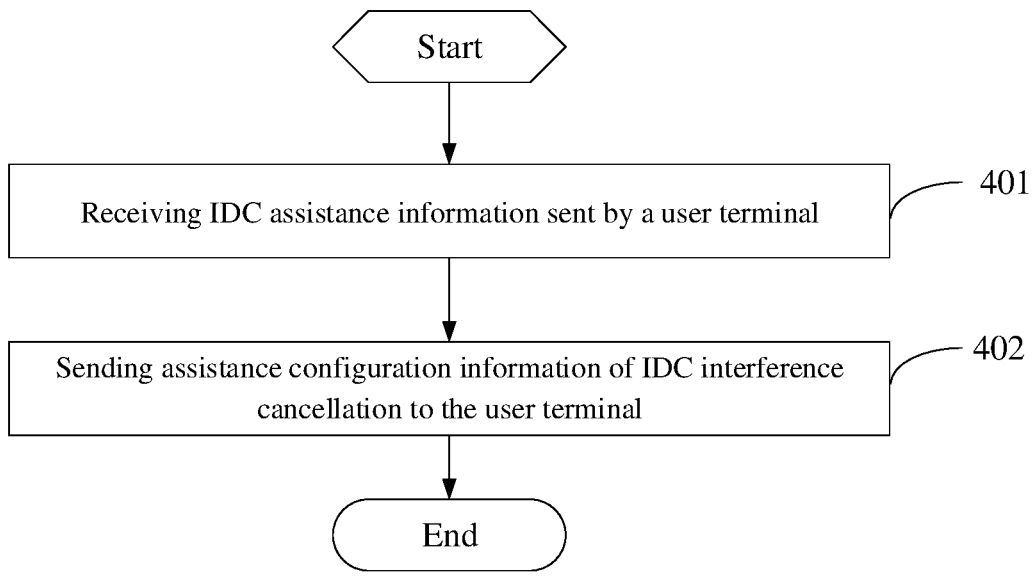
FIG. 4 is a flowchart of another method of transmitting configuration information provided by some embodiments of the present disclosure.

Referring to FIG. 4, FIG. 4 is a flowchart of another method of transmitting configuration information provided by some embodiments of the present disclosure, and the method is applied to the MN. As shown in FIG. 4, the method includes following steps 401-402.

Step 401: receiving IDC assistance information sent by a user terminal.

Step 402: sending assistance configuration information of IDC interference cancellation to the user terminal, wherein the assistance configuration information of IDC interference cancellation corresponds to the IDC assistance information.

Optionally, before receiving the IDC assistance information sent by the user terminal, the method further includes: sending a request message to the user terminal, wherein the request message is used to request the user terminal to report capability indication information; receiving capability indication information sent by the user terminal, wherein the capability indication information is used to indicate whether the user terminal supports an IDC assistance function; sending report indication information to the user terminal, wherein the report indication information is used to indicate whether at least one of an MCG and an SCG allows the user terminal to report the IDC assistance information.

Optionally, after receiving the capability indication information sent by the user terminal, and before sending the report indication information to the user terminal, the method further includes: determining configuration information of the IDC assistance information through transmitting a signaling between the MN and the SN, wherein, the configuration information of the IDC assistance information includes at least one of a measurement object identifier, a measurement configuration identifier, a measurement identifier, and the report indication information.

Optionally, the configuration information of the IDC assistance information is sent by the MN to the SN, and the SN sends or does not send a feedback message to the MN. The feedback message is used to indicate whether or not to accept the configuration information of the IDC assistance information, wherein if the SN does not send the feedback message, then it may be deemed that the SN accepts the configuration information of the IDC assistance information; or the configuration information of the IDC assistance information is sent by the SN to the MN, and the MN sends or does not send a feedback message to the SN, wherein the feedback message is used to indicate whether or not to accept the configuration information of the IDC assistance information, wherein if the MN does not send the feedback message, then it may be deemed that the MN accepts the configuration information of the IDC assistance information.

Optionally, the IDC assistance information includes at least one of IDC assistance information of the MCG and IDC assistance information of the SCG. The assistance configuration information of IDC interference cancellation sent to the user terminal includes at least one of assistance configuration information of IDC interference cancellation of the MCG and assistance configuration information of IDC interference cancellation of the SCG.

It should be noted that, in this embodiment, the assistance configuration information of IDC interference cancellation of the SCG may correspond to the IDC assistance information of the SCG, and the assistance configuration information of IDC interference cancellation of the MCG may correspond to the IDC assistance information of the MCG. In addition, this embodiment can be applied to cases where an SRB is not established between the user terminal and the SN, and an SRB is established between the user terminal and the SN.

For example, in a case where an SRB is not established between the user terminal and the SN, the IDC assistance information includes at least one of IDC assistance information of the MCG and IDC assistance information of the SCG.

Before sending the assistance configuration information of IDC interference cancellation to the user terminal, the method further includes sending the IDC assistance information to the SN, and receiving the assistance configuration information of IDC interference cancellation of the SCG sent by the SN; and the assistance configuration information of IDC interference cancellation sent to the user terminal may include at least one of assistance configuration information of IDC interference cancellation of the MCG and assistance configuration information of IDC interference cancellation of the SCG. Of course, if the user terminal sends IDC assistance information that does not include the IDC assistance information of the SCG, the MN may not send the IDC assistance information to the SN, or may send the IDC assistance information of the MCG to the SN, which is not limited thereto.

For example, in a case where an SRB is established between the user terminal and the SN, the IDC assistance information includes IDC assistance information of the MCG. The assistance configuration information of IDC interference cancellation includes the assistance configuration information of IDC interference cancellation of the MCG, and the assistance configuration information of IDC interference cancellation of the MCG corresponds to the IDC assistance information of the MCG.

It should be noted that, the embodiment is an embodiment of the MN corresponding to the embodiments shown in FIGS. 2 to 3, specific implementation of the embodiment of the MN may be obtained by referring to the embodiments shown in FIGS. 2 to 3, and the same beneficial effect is achieved, description will not be repeated here in order to avoid repetition.

Figure 5:
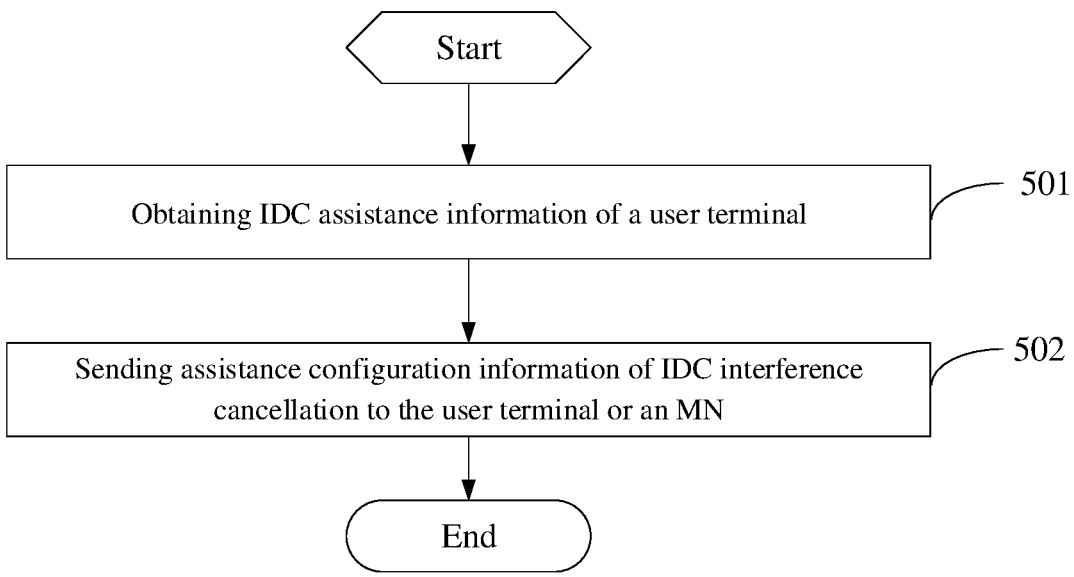
FIG. 5 is a flowchart of another method of transmitting configuration information provided by some embodiments of the present disclosure.

Referring to FIG. 5, FIG. 5 is a flowchart of a method of transmitting configuration information provided by some embodiments of the present disclosure, and the method is applied to an SN. As shown in FIG. 5, the method includes following steps 501-502.

Step 501: obtaining IDC assistance information of a user terminal.

Step 502: sending assistance configuration information of IDC interference cancellation to the user terminal or the MN, wherein the assistance configuration information of IDC interference cancellation corresponds to the IDC assistance information.

Optionally, before obtaining the IDC assistance information of the user terminal, the method further includes: determining configuration information of the IDC assistance information through transmitting a signaling between the SN and the MN, wherein, the configuration information of the IDC assistance information includes at least one of following: a measurement object identifier, a measurement configuration identifier, a measurement identifier, and report indication information for indicating whether the user terminal is allowed to report the IDC assistance information.

Optionally, the configuration information of the IDC assistance information is sent by the MN to the SN, and the SN sends or does not send a feedback message to the MN. The feedback message is used to indicate whether to accept configuration information of the IDC assistance information, wherein if the SN does not send the feedback message, then the SN is deemed to accept the configuration information of the IDC assistance information.

Optionally, the configuration information of the IDC assistance information is sent by the SN to the MN, and the MN sends or does not send a feedback message to the SN. The feedback message is used to indicate whether to accept the configuration information of the IDC assistance information, wherein if the MN does not send the feedback message, then the MN is deemed to accept the configuration information of the IDC assistance information.

Optionally, the IDC assistance information includes at least one of: IDC assistance information of the MCG and IDC assistance information of the SCG; the assistance configuration information of IDC interference cancellation includes at least one of following: assistance configuration information of IDC interference cancellation of the MCG and assistance configuration information of IDC interference cancellation of the SCG.

It should be noted that, in this embodiment, the assistance configuration information of IDC interference cancellation of the SCG may correspond to the IDC assistance information of the SCG, and the assistance configuration information of IDC interference cancellation of the MCG may correspond to the IDC assistance information of the MCG. In addition, this embodiment can be applied to a case where an SRB is not established between the user terminal and the SN, and an SRB is o established between the user terminal and the SN.

For example, in a case where an SRB is not established between the user terminal and the SN, obtaining the IDC assistance information of the user terminal may include receiving the IDC assistance information sent by the MN, wherein the IDC assistance information includes at least one of IDC assistance information of the MCG and IDC assistance information of the SCG; and sending the assistance configuration information of IDC interference cancellation to the user terminal or to the MN, may include sending the assistance configuration information of IDC interference cancellation to the MN, wherein the assistance configuration information of IDC interference cancellation includes at least one of the assistance configuration information of IDC interference cancellation of the MCG and the assistance configuration information of IDC interference cancellation of the SCG.

For example, in a case where an SRB is established between the user terminal and the SN, obtaining the IDC assistance information of the user terminal may include receiving the IDC assistance information of the SCG sent by the user terminal; and sending the assistance configuration information of IDC interference cancellation to the user terminal or to the MN may include sending the assistance configuration information of IDC interference cancellation of the SCG to the user terminal.

It should be noted that, the embodiment is an embodiment of the SN corresponding to the embodiments shown in FIGS. 2 to 3, specific implementation of the embodiment of the SN may be obtained by referring to the embodiments shown in FIGS. 2 to 3, and the same beneficial effect is achieved, description will not be repeated here in order to avoid repetition.

Figure 6:
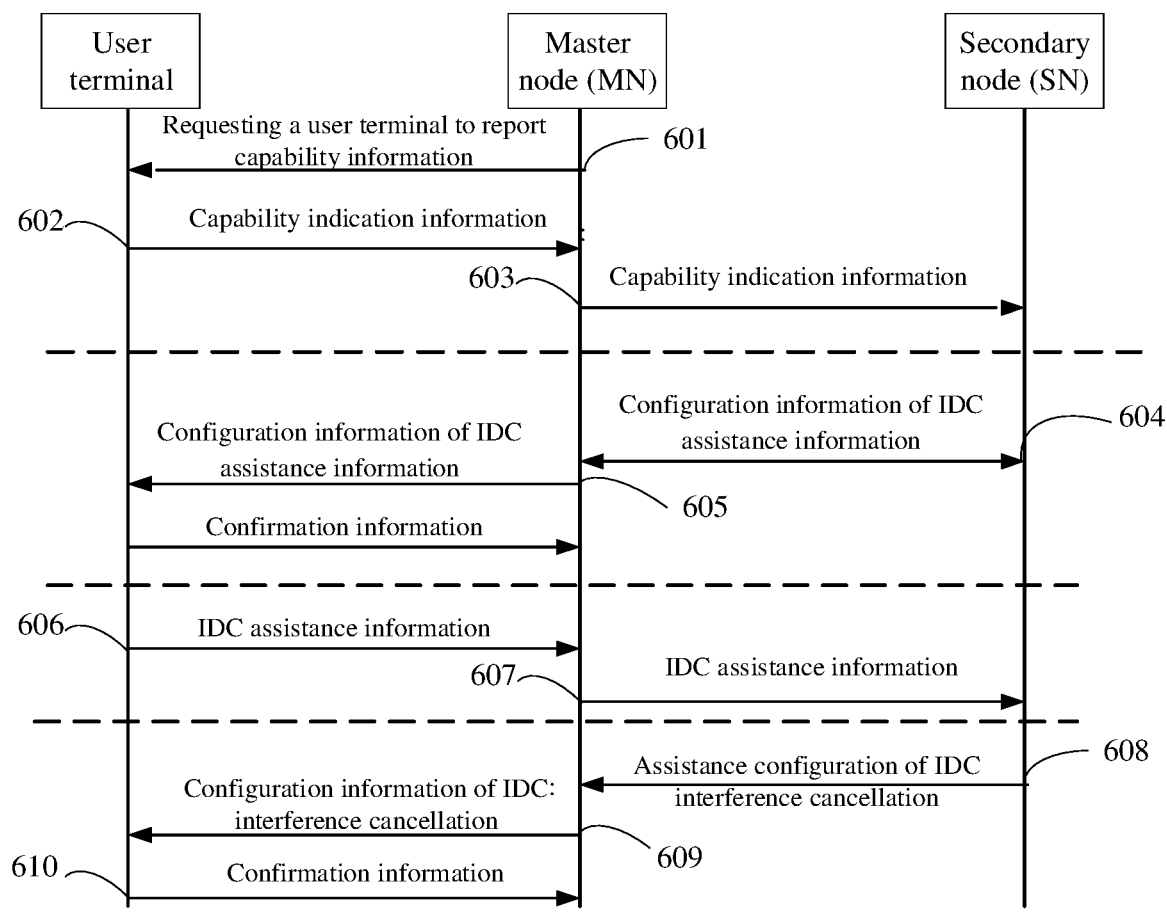
FIG. 6 is a schematic diagram of another method of transmitting configuration information provided by some embodiments of the present disclosure.

Referring to FIG. 6, FIG. 6 is a schematic diagram of another method of transmitting configuration information provided by some embodiments of the present disclosure. This method is exemplified by a case where the user terminal is not configured with the SRB3. As shown in FIG. 6, the method includes the following steps 601-610.

Step 601: requesting, by the MN, a user terminal to report capability information (e.g., UE Capability Enquiry) of the user terminal.

Step 602: reporting, by the user terminal, capability indication information indicating whether the user terminal supports an IDC assistance function (e.g., idc-Support in UE Capability Information)

Step 603: sending the capability indication information (ids-Support in the UE Capability Information) indicating whether the user terminal supports the IDC assistance function to the SN by the MN.

Step 604: negotiating, by the MN and the SN, to control the user terminal to report configuration information (e.g., IDC Coordination Procedure) of the IDC assistance information. The process includes any combination of one or more of following ways: 1) the MN sends "configuration information of IDC assistance information" to the SN, and the SN can select to feedback or not feedback whether or not to accept the configuration information, and if not feedback, then it means that the SN accepts the configuration; 2) the SN sends "configuration information of IDC assistance information" to the MN, and the MN may select to feedback or not feedback whether or not to accept the configuration information, and if not feedback, then it means that the MN accepts the configuration.

The configuration information of the IDC assistance information includes any combination of one or more of the following: the measurement object identifier, the measurement configuration identifier, the measurement identifier, and the configuration about whether a UE is allowed to report the IDC assistance information.

Step 605: sending, by the MN to the user terminal, configuration information about whether the user terminal is allowed to report the IDC assistance information, wherein the configuration information includes any combination of one or more of the following: configuration (e.g., idc-Config MCG) of the MCG about whether a user terminal is allowed to report the IDC assistance information; configuration (e.g., idc-Config SCG) of the SCG about whether a user terminal is allowed to report the IDC assistance information.

Step 606: feeding back, by the user terminal, confirmation information (e.g., RRC Reconfiguration Complete) to the MN.

Step 607: reporting, by the user terminal, IDC assistance information to the network side, wherein the information includes any combination of one or more of the following: assistance information (such as idc-Assistance MCG) sent to the MN; assistance information (such as In Device Coex-Indication SCG) sent to the SN.

Step 608: sending the IDC assistance information reported in step 607 to the SN (e.g., IDC Indication) by the MN, wherein the information includes any combination of one or more of the following: assistance information (such as idc-Assistance MCG) sent to the MN; assistance information (such as In Device CoexIndication SCG) sent to the SN.

Step 609: sending assistance configuration information (e.g., idc-Improve SCG) of IDC interference cancellation to the MN by the SN.

Step 6010: sending, the assistance configuration information of IDC interference cancellation to the user terminal by the MN, wherein the configuration information includes any combination of one or more of the following: interference cancellation assistance configuration information of the MCG (e.g. idc-Improve MCG); interference cancellation assistance configuration information of the SCG (e.g. idc-Improve SCG)

Step 6011: sending configuration confirmation information to the network side by the user terminal.

Figure 7:
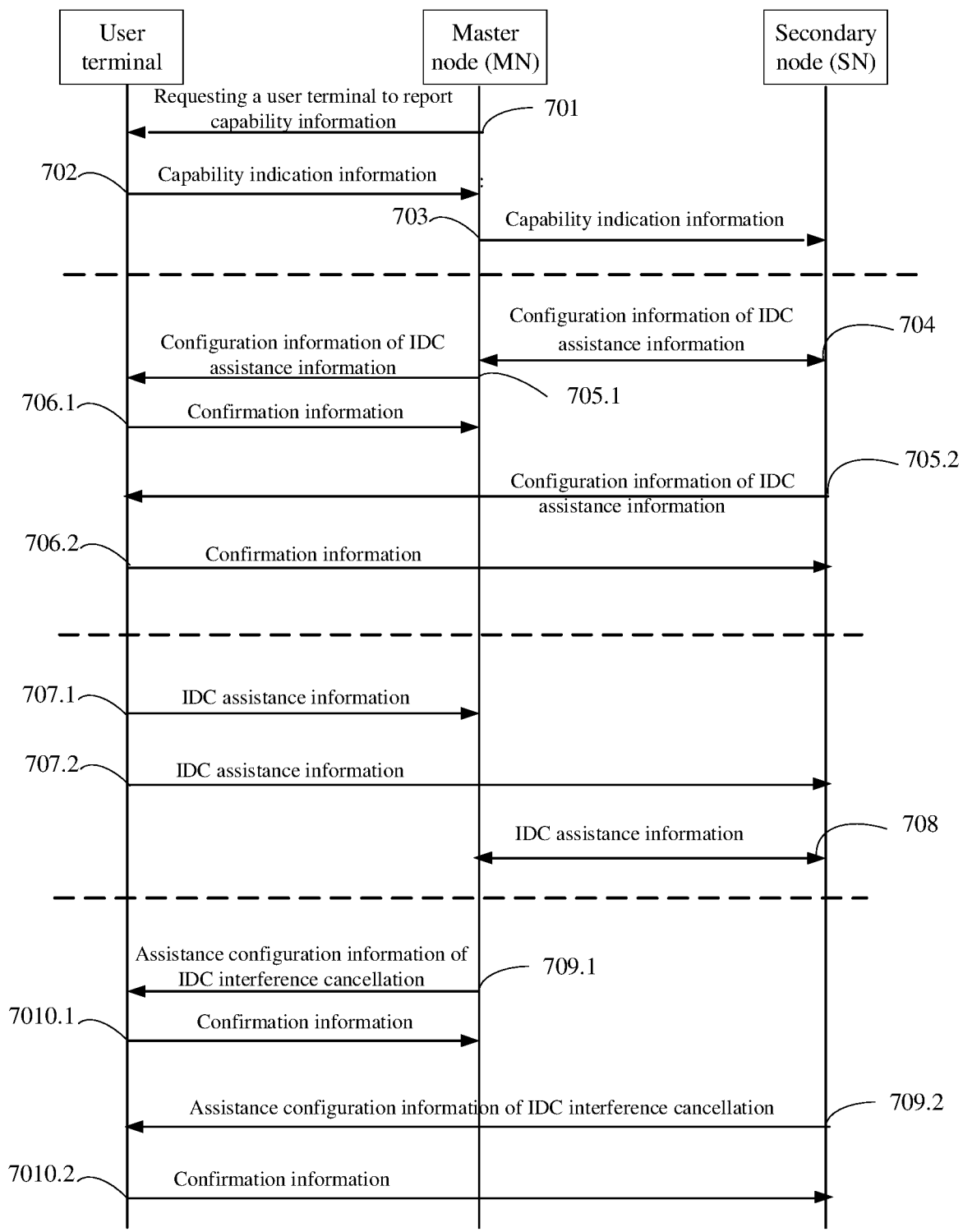
FIG. 7 is a schematic diagram of another method of transmitting configuration information provided by some embodiments of the present disclosure.

Referring to FIG. 7, FIG. 7 is a schematic diagram of another method of transmitting configuration information provided in some embodiments of the present disclosure. The method is exemplified by a case where a user terminal is configured with the SRB3. As shown in FIG. 7, the method includes following steps 701-710.

Step 701: requesting, by the MN, user terminal to report capability information (e.g., UE Capability Enquiry) of the user terminal.

Step 702: reporting, by the user terminal, capability indication information (e.g., idc-Support in the UE Capability Information) indicating whether the user terminal supports the IDC assistance function.

Step 703: sending, by the MN to the SN, the capability indication information (idc-Support in the UE Capability Information) indicating whether the user terminal supports the IDC assistance function.

Step 704: negotiate, by the MN and the SN, to control the user terminal to report configuration information of the IDC assistance information (e.g., IDC Coordination Procedure), wherein the procedure includes any combination of one or more of the following ways: 1) the MN sends "configuration information of IDC assistance information" to the SN, and the SN can select to feedback or not feedback whether or not to accept the configuration information, and if not feedback, then it means that the SN accepts the configuration; 2) the SN sends "configuration information of IDC assistance information" to the MN, and the MN may select to feedback or not feedback whether or not to accept the configuration information, and if not feedback, then it means that the MN accepts the configuration.

The configuration information of the IDC assistance information includes any combination of one or more of the following: the measurement object identifier, the measurement configuration identifier, the measurement identifier, and the configuration about whether a UE is allowed to report the IDC assistance information.

Step 705.1: sending, by the MN to the user terminal, configuration information about whether the user terminal is allowed to report the IDC assistance information (e.g., idc-Config MCG).

Step 705.2: sending, by the SN to the user terminal, configuration information about whether the user terminal is allowed to report the IDC assistance information (e.g., idc-Config SCG).

Step 706.1: feeding back, by the user terminal, confirmation information (e.g., RRC Reconfiguration Complete) to the MN.

Step 706.2: feeding back, by the user terminal, confirmation information (e.g., RRC Reconfiguration Complete) to the SN.

Step 707.1: reporting, by the user terminal, IDC assistance information (such as In Device CoexIndication) to the MN.

Step 707.2: reporting, by the user terminal, IDC assistance information (such as In Device CoexIndication) to the SN.

The IDC assistance information reported by the user terminal to the MN and the IDC assistance information reported by the user terminal to the SN may be the same or different.

Step 708: sending, to SN by the MN, the assistance information (e.g., IDC Indication) reported by the user terminal, or sending, to MN by the SN, the assistance information (IDC Indication) reported by the user terminal.

Step 709.1: sending, the assistance configuration information of IDC interference cancellation to the user terminal by the MN.

Step 709.2: sending, the assistance configuration information of IDC interference cancellation to the user terminal by the SN.

Step 7010.1: sending configuration confirmation information to the MN by the user terminal.

Step 7010.2: sending configuration confirmation information to the SN by the user terminal.

It should be noted that, in this embodiment, steps 705.1 and 705.2, step 706.1 (corresponding to step 705.1) and step 706.2 (corresponding to step 705.2), step 707.1 and step 707.2, step 709.1 and step 709.2, step 7010.1 (corresponding to step 709.1) and step 7010.2 (corresponding to step 709.2) are independent signaling processes and have no sequential relation with each other. For example, steps 705.1 and 705.2 are separate signaling processes, and no sequential relation is defined for the processes.

Figure 8:
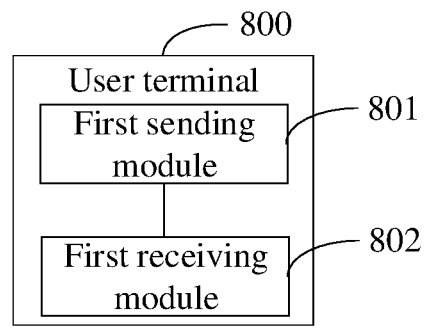
FIG. 8 is a structural diagram of a user terminal provided by some embodiments of the present disclosure.

Referring to FIG. 8, FIG. 8 is a structure diagram of a user terminal provided in some embodiments of the present disclosure. As shown in FIG. 8, the user terminal 800 includes a first sending module 801 and a first receiving module 802.

The first sending module 801 is used to sending IDC assistance information to a network-side device, wherein the network-side device includes at least one of an MN and an SN. The first receiving module 802 is used to receive assistance configuration information of IDC interference cancellation sent by the network-side device, wherein the assistance configuration information of IDC interference cancellation corresponds to the IDC assistance information.

Figure 9:
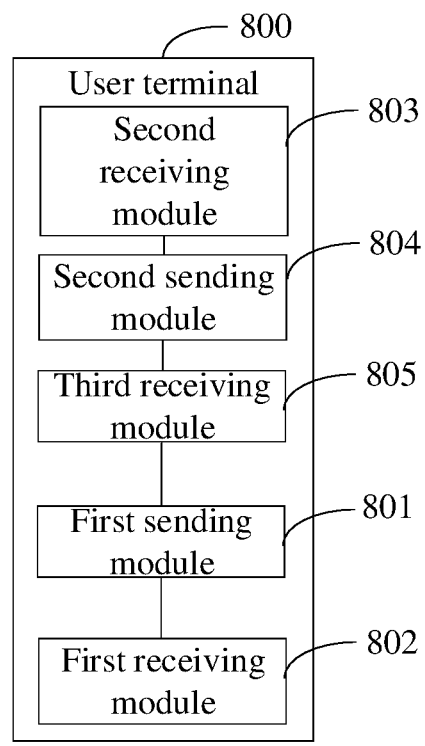
FIG. 9 is a structural diagram of another user terminal provided by some embodiments of the present disclosure.

Optionally, as shown in FIG. 9, the user terminal 800 further includes: a second receiving module 803, used to receive a request message sent by the MN, wherein the request message is used to request the user terminal to report capability indication information; a second sending module 804, used to send the capability indication information to the MN, wherein the capability indication information is used to indicate whether the user terminal supports an IDC assistance function; a third receiving module 805, used to receive report indication information, wherein the report indication information is used to indicate whether the user terminal is allowed to report IDC assistance information.

Optionally, if a signaling radio bearer (SRB) is not established between the user terminal and the SN, the report indication information is sent by the MN. The report indication information is used to indicate whether at least one of a Master Cell Group (MCG) and a secondary cell group (SCG) allows the user terminal to report the IDC assistance information; or, if an SRB is established between the user terminal and the SN, the report indication information includes at least one of first report indication information and second report indication information, wherein, the first report indication information is report indication information sent by the MN for indicating whether the MCG allows the user terminal to report the IDC assistance information, and the second report indication information is report indication information sent by the SN for indicating whether the SCG allows the user terminal to report the IDC assistance information.

Optionally, an SRB is not established between the user terminal and the SN; the network-side device is the MN, and the IDC assistance information includes at least one of IDC assistance information of the MCG and IDC assistance information of the SCG; the assistance configuration information includes at least one of the assistance configuration information of IDC interference cancellation of the MCG and the assistance configuration information of IDC interference cancellation of the SCG.

Optionally, an SRB is established between the user terminal and the SN; the network-side device includes at least one of the MN and the SN; the assistance configuration information includes at least one of the assistance configuration information of IDC interference cancellation of the MCG and the assistance configuration information of IDC interference cancellation of the SCG.

The user terminal provided in the embodiments of the present disclosure can implement various processes implemented by the user terminal in the method embodiments of FIGS. 2 to 3, and in order to avoid repetition, description thereof is omitted here, and IDC interference of the user terminal can be reduced.

Figure 10:
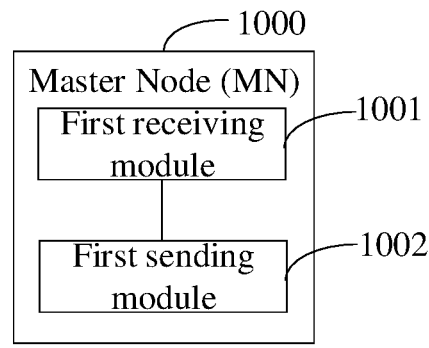
FIG. 10 is a structural diagram of an MN provided by some embodiments of the present disclosure.

Referring to FIG. 10, some embodiments of the present disclosure provide a structure diagram of an MN. As shown in FIG. 10, the MN 1000 includes: a first receiving module 1001, used to receive IDC assistance information sent by a user terminal; a first sending module 1002, used to send assistance configuration information of IDC interference cancellation to the user terminal, wherein the assistance configuration information of IDC interference cancellation corresponds to the IDC assistance information.

Figure 11:
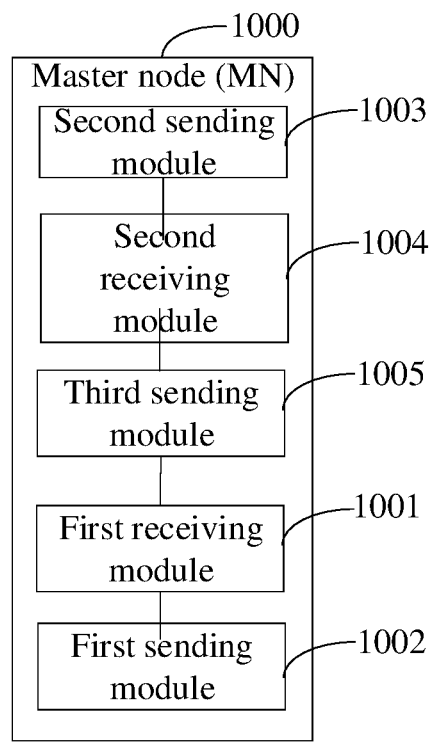
FIG. 11 is a structure diagram of another MN provided by some embodiments of the present disclosure.

Optionally, as shown in FIG. 11, the MN 1000 further includes: a second sending module 1003, used to send a request message to the user terminal, wherein the request message is used to request the user terminal to report capability indication information; a second receiving module 1004, used to receive the capability indication information sent by the user terminal, wherein the capability indication information is used to indicate whether the user terminal supports an IDC assistance function; a third sending module 1005, used to send report indication information to the user terminal, wherein the report indication information is used to indicate whether at least one of the MCG and the SCG allows the user terminal to report the IDC assistance information.

Figure 12:
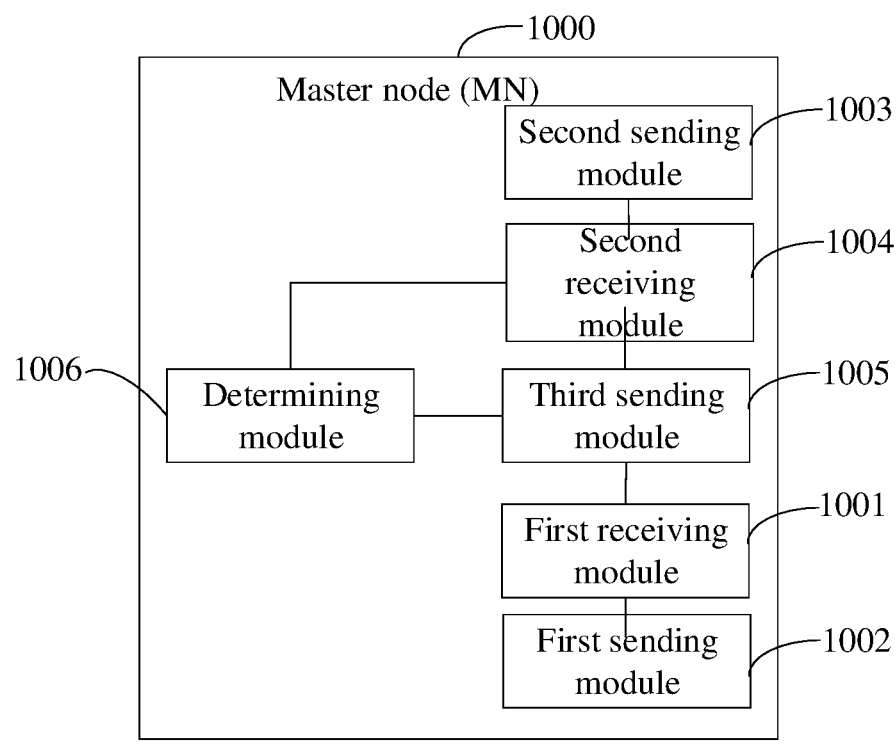
FIG. 12 is a structure diagram of another MN provided by some embodiments of the present disclosure.

Optionally, as shown in FIG. 12, the MN 1000 further includes: a determining module 1006, used to determine configuration information of the IDC assistance information by transmitting a signaling between the MN and the SN, wherein, the configuration information of the IDC assistance information includes at least one of a measurement object identifier, a measurement configuration identifier, a measurement identifier, and the report indication information.

Optionally, the configuration information of the IDC assistance information is sent by the MN to the SN, and the SN sends or does not send a feedback message to the MN. The feedback message is used to indicate whether to accept the configuration information of the IDC assistance information, wherein if the SN does not send the feedback message, then the SN is deemed to accept configuration information of the IDC assistance information; or the configuration information of the IDC assistance information is sent by the SN to the MN, and the MN sends or does not send a feedback message to the SN, wherein the feedback message is used to indicate whether to accept the configuration information of the IDC assistance information, wherein if the MN does not send the feedback message, then the MN is deemed to accept the configuration information of the IDC assistance information.

Optionally, the IDC assistance information includes at least one of IDC assistance information of the MCG and IDC assistance information of the SCG; the assistance configuration information of IDC interference cancellation sent to the user terminal includes at least one of assistance configuration information of IDC interference cancellation of the MCG and assistance configuration information of IDC interference cancellation of the SCG.

The base station provided in the embodiment of the present disclosure can implement various processes implemented by the MN in the method embodiment of FIG. 4, and in order to avoid repetition, the detailed description thereof is omitted here, and the IDC interference at the user terminal can be reduced.

Figure 13:
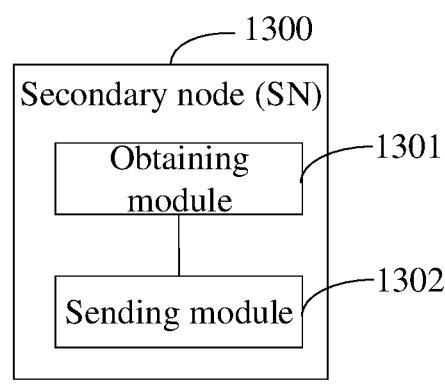
FIG. 13 is a structural diagram of an SN provided by some embodiments of the present disclosure.

Referring to FIG. 13, a structure diagram of an SN provided by some embodiments of the present disclosure is shown in FIG. 13, the SN 1300 includes: an obtaining module 1301, used to obtain IDC assistance information of a user terminal; a sending module 1302, used to send assistance configuration information of IDC interference cancellation to the user terminal or an MN, wherein the assistance configuration information of IDC interference cancellation corresponds to the IDC assistance information.

Figure 14:
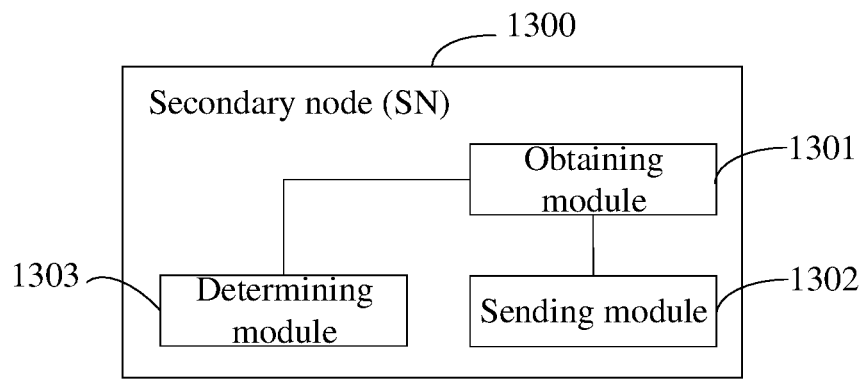
FIG. 14 is a structure diagram of another SN provided by some embodiments of the present disclosure.

Optionally, as shown in FIG. 14, the SN 1300 further includes: a determining module 1303, used to determine configuration information of the IDC assistance information by transmitting a signaling between the MN and the SN, wherein, the configuration information of the IDC assistance information includes at least one of a measurement object identifier, a measurement configuration identifier, a measurement identifier, and report indication information for indicating whether the user terminal is allowed to report the IDC assistance information.

Optionally, the configuration information of the IDC assistance information is sent by the MN to the SN, and the SN sends or does not send a feedback message to the MN. The feedback message is used to indicate whether to accept the configuration information of the IDC assistance information, wherein if the SN does not send the feedback message, then the SN is deemed to accept configuration information of the IDC assistance information.

Optionally, the configuration information of the IDC assistance information is sent by the SN to the MN, and the MN sends or does not send a feedback message to the SN. The feedback message is used to indicate whether to accept the configuration information of the IDC assistance information, wherein if the MN does not send the feedback message, then the MN is deemed to accept the configuration information of the IDC assistance information.

Optionally, the IDC assistance information includes at least one of IDC assistance information of the MCG and IDC assistance information of the SCG; the assistance configuration information of IDC interference cancellation includes at least one of assistance configuration information of IDC interference cancellation of the MCG and assistance configuration information of IDC interference cancellation of the SCG.

The base station provided in the embodiment of the present disclosure can implement various processes implemented by the SN in the method embodiment of FIG. 4, and in order to avoid repetition, the detailed description is omitted here, and the IDC interference at the user terminal can be reduced.

Figure 15:
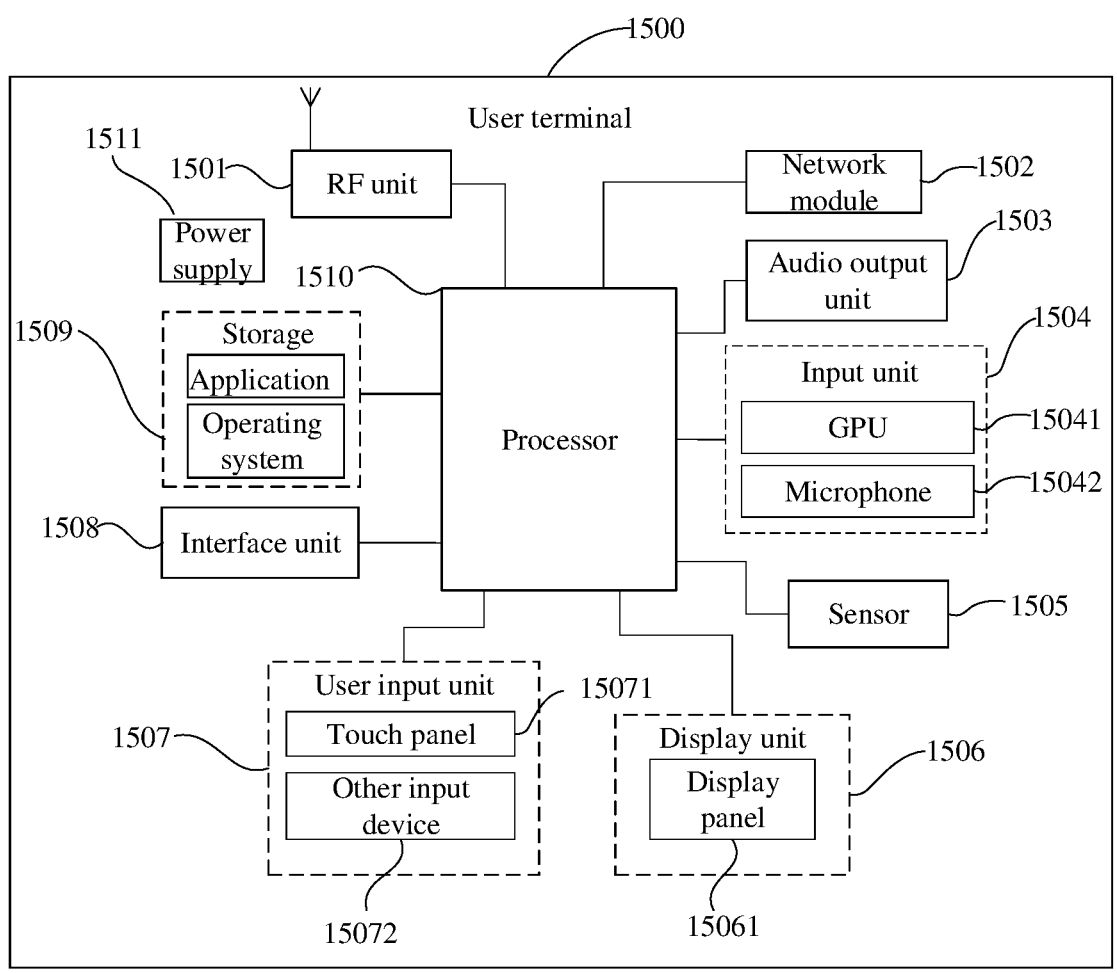
FIG. 15 is a structural diagram of another user terminal provided by some embodiments of the present disclosure.

FIG. 15 is a schematic diagram of a hardware structure of a user terminal implementing various embodiments of the present disclosure.

The user terminal 1500 includes, but is not limited to, a radio frequency unit 1501, a network module 1502, an audio output unit 1503, an input unit 1504, a sensor 1505, a display unit 1506, a user input unit 1507, an interface unit 1508, a storage 1509, a processor 1510, and a power supply 1511. Those skilled in the art will appreciate that the terminal structure shown in FIG. 15 does not constitute a limitation to a terminal. The terminal may include more or fewer components than illustrated components, or combine certain components, or different component arrangements. In an embodiment of the present disclosure, the terminal include, but is not limited to, a mobile phone, a tablet computer, a notebook computer, a palmtop computer, an in-vehicle terminal, a wearable device, a pedometer, and the like.

The radio frequency unit 1501 is used to send IDC assistance information to a network-side device, wherein, the network-side device includes at least one of a master node (MN) and a secondary node (SN); and the radio frequency unit is used to receive assistance configuration information of IDC interference cancellation sent by the network-side device, wherein, the assistance configuration information of IDC interference cancellation corresponds to the IDC assistance information.

Optionally, before sending the IDC assistance information to the network-side device, the radio frequency unit 1501 is further used to receive a request message sent by the MN, wherein the request message is used to request the user terminal to report capability indication information; send the capability indication information to the MN, wherein the capability indication information is used to indicate whether the user terminal supports an IDC assistance function; receive report indication information, wherein the report indication information is used to indicate whether the user terminal is allowed to report the IDC assistance information.

Optionally, if a signaling radio bearer (SRB) is not established between the user terminal and the SN, then the report indication information is sent by the MN, the report indication information is used to indicate whether at least one of a Master Cell Group (MCG) and a Secondary Cell Group (SCG) allows the user terminal to report the IDC assistance information; or, if an SRB is established between the user terminal and the SN, the report indication information includes at least one of first report indication information and second report indication information, wherein, the first report indication information is report indication information sent by the MN for indicating whether the MCG allows the user terminal to report the IDC assistance information, and the second report indication information is report indication information sent by the SN for indicating whether the SCG allows the user terminal to report the IDC assistance information.

Optionally, an SRB is not established between the user terminal and the SN; the network-side device is the MN, and the IDC assistance information includes at least one of IDC assistance information of the MCG and IDC assistance information of the SCG; the assistance configuration information includes at least one of assistance configuration information of IDC interference cancellation of the MCG and assistance configuration information of IDC interference cancellation of the SCG.

Optionally, an SRB is established between the user terminal and the SN; the network-side device includes at least one of the MN and the SN; the assistance configuration information includes at least one of assistance configuration information of IDC interference cancellation of the MCG and assistance configuration information of IDC interference cancellation of the SCG.

The user terminal can reduce IDC interference at the user terminal.

It should be understood that, in the embodiments of the present disclosure, the radio frequency unit 1501 may be used for receiving and transmitting signals in processes of transmitting and receiving information or talking. Specifically, after the radio frequency unit 1501 receives downlink data from the base station, and the downlink data is transferred by the radio frequency unit 1501 to the processor 1510 for processing; and additionally the radio frequency unit 1501 sends uplink data to the base station. Generally, the radio frequency unit 1501 includes, but is not limited to, an antenna, at least one amplifier, a transceiver, a coupler, a low noise amplifier, a duplexer, and the like. In addition, the radio frequency unit 1501 may also communicate with a network and other devices through a wireless communication system.

The user terminal provides a wireless broadband internet access to the user through the network module 1502, such as helping the user to send and receive emails, browse web pages, access streaming media, and the like.

The audio output unit 1503 may convert audio data received by the radio frequency unit 1501 or the network module 1502 or stored in the storage 1509 into an audio signal and output the audio signal as sound. The audio output unit 1503 may also provide audio output (e.g., a call signal reception sound, a message reception sound, etc.) related to a specific function performed by the user terminal 1500. The audio output unit 1503 includes a speaker, a buzzer, a receiver, and the like.

The input unit 1504 is used to receive an audio or video signal. The input unit 1504 may include a Graphics Processing Unit (GPU) 15041 and a microphone 15042. The graphics processing unit 15041 processes image data of a still picture or a video obtained by an image capturing device such as a camera in a video capturing mode or an image capturing mode. The processed image frame may be displayed on the display unit 1506. Image frames processed by the graphics processing unit 15041 may be stored in the storage 1509 (or other storage media) or sent via the radio frequency unit 1501 or the network module 1502. The microphone 15042 may receive sound and be able to process such sound into audio data. The processed audio data may be converted, in a case of a telephone call mode, into a format output that may be sent to a mobile communication base station via the radio frequency unit 1501.

The user terminal 1500 also includes at least one sensor 1505, such as a light sensor, a motion sensor, and other sensors. In particular, the light sensor includes an ambient light sensor and a proximity sensor, wherein the ambient light sensor may adjust brightness of the display panel 15061 according to brightness of ambient light. The proximity sensor may turn off the display panel 15061 and/or a backlight when the user terminal 1500 moves close to the ear. As one type of motion sensor, the accelerometer sensor can detect a value of an acceleration in each direction (generally the three axes directions), and can detect a magnitude and a direction of gravity when being stationary, can be used to recognize a posture of a terminal (such as horizontal-vertical screen switching, a related game, a magnetometer posture calibration), a vibration-recognition related function (such as a pedometer, tapping), and the like. The sensor 1505 may further include a fingerprint sensor, a pressure sensor, an iris sensor, a molecular sensor, a gyroscope, a barometer, a hygrometer, a thermometer, an infrared sensor, and the like, which will not be described herein.

The display unit 1506 is used to display information inputted by the user or information provided to the user. The display unit 1506 may include a display panel 15061 that may be configured in the form of a Liquid Crystal Display (LCD), an Organic Light-Emitting Diode (OLED), or the like.

The user input unit 1507 may be used to receive inputted digital or character information and generate a key signal input related to user-setting and function control of a terminal. Specifically, the user input unit 1507 includes a touch panel 15071 and other input devices 15072. The touch panel 15071, also referred to as a touch screen, may collect a touch operation (e.g., an operation of a user using any suitable object or accessory, such as a finger, stylus, or the like, on or near the touch panel 15071) of the user on or near the touch panel 15071. The touch panel 15071 may include two parts of a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 1510, and receives and executes commands from the processor 1510. In addition, the touch panel 15071 may be implemented in various types such as a resistance type, a capacitance type, an infrared ray, and a surface acoustic wave. The user input unit 1507 may include other input devices 15072 in addition to the touch panel 15071. Specifically, the other input devices 15072 may include, but are not limited to, a physical keyboard, function keys (such as volume control keys, switch keys, etc.), a trackball, a mouse, and a joystick, which will not be described herein.

Further, the touch panel 15071 may be overlaid on the display panel 15061, and after the touch panel 15071 detects a touch operation on or near the touch panel 15071, the touch operation is sent by touch panel 15071 to the processor 1510 to determine the type of a touch event. The processor 1510 then provides a corresponding visual output on the display panel 15061 according to the type of the touch event. Although in FIG. 15, the touch panel 15071 and the display panel 15061 are two separate components for implementing input and output functions of the terminal, the input and output functions of the terminal in some embodiments may be realized by integrating the touch panel 15071 with the display panel 15061, and the present disclosure is not limited thereto.

The interface unit 1508 is an interface in which an external device is connected to the user terminal 1500. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 1508 may be used to receive input (e.g., data information, power, etc.) from an external device and transmit the received input to one or more elements within the user terminal 1500 or may be used to transmit data between the user terminal 1500 and the external device.

The storage 1509 may be used to store software programs and various types of data. The storage 1509 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 1509 may include a high speed random access memory, and may also include a non-volatile memory, such as at least one disk storage device, a flash memory device, or other volatile solid state storage device.

The processor 1510 is a console of the terminal, connects various parts of the entirety of the terminal using various interfaces and lines, and executes various functions and processes data of the terminal by running or executing software programs and/or modules stored in the storage 1509, and by calling data stored in the storage 1509, thereby integrally monitoring the terminal. The processor 1510 may include one or more processing units; optionally, the processor 1510 may integrate an application processor and a modem processor, wherein the application processor primarily processes an operating system, a user interface, an application program, etc. The modem processor mainly handles wireless communication. It will be appreciated that the above-described modem processor may also not be integrated into the processor 1510.

The user terminal 1500 may also include a power supply 1511 (such as a battery) that supplies power to various components, optionally, the power supply 1511 may be logically connected to the processor 1510 via a power management system. Thus, functions such as charging, discharging, and power consumption management are managed by the power management system.

In addition, the user terminal 1500 includes some functional modules (not shown), which will not be described here.

Optionally, the embodiments of the present disclosure also provide a terminal. The terminal includes a processor 1510, a storage 1509, a computer program stored on the storage 1509 and operable on the processor 1510, wherein when the computer program is executed by the processor 1510, each process of the above-described embodiments of the method of transmitting configuration information is realized, and the same technical effect can be achieved, and the description thereof is omitted here to avoid repetition.

Figure 16:
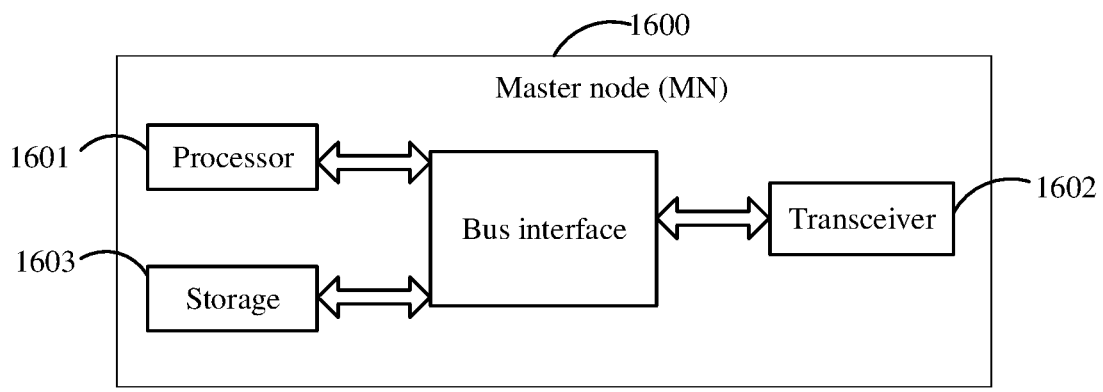
FIG. 16 is a structural diagram of another MN provided by some embodiments of the present disclosure.

Referring to FIG. 16, FIG. 16 is a structural diagram of another MN provided by some embodiments of the present disclosure. As shown in FIG. 16, the MN 1600 includes a processor 1601, a transceiver 1602, a storage 1603, and a bus interface, wherein: the transceiver 1602 is used for receiving IDC assistance information sent by a user terminal; sending assistance configuration information of IDC interference cancellation to a user terminal, wherein the assistance configuration information of IDC interference cancellation corresponds to the IDC assistance information.

Optionally, before receiving the IDC assistance information sent by the user terminal, the transceiver 1602 is further used for: sending a request message to the user terminal, wherein the request message is used to request the user terminal to report capability indication information; receiving capability indication information sent by the user terminal, wherein the capability indication information is used to indicate whether the user terminal supports an IDC assistance function; sending report indication information to the user terminal, wherein the report indication information is used to indicate whether at least one of the MCG and the SCG allows the user terminal to report the IDC assistance information.

Optionally, after receiving the capability indication information sent by the user terminal, before sending the report indication information to the user terminal, the transceiver 1602 is further used for: determining configuration information of the IDC assistance information by transmitting a signaling between the SN and the MN, wherein, the configuration information of the IDC assistance information includes at least one of a measurement object identifier, a measurement configuration identifier, a measurement identifier, and the report indication information.

Optionally, the configuration information of the IDC assistance information is sent by the MN to the SN, and the SN sends or does not send a feedback message to the MN; the feedback message is used to indicate whether to accept the configuration information of the IDC assistance information, wherein if the SN does not send the feedback message, then the SN is deemed to accept configuration information of the IDC assistance information; or the configuration information of the IDC assistance information is sent by the SN to the MN, and the MN sends or does not send a feedback message to the SN, wherein the feedback message is used to indicate whether to accept the configuration information of the IDC assistance information, wherein if the MN does not send the feedback message, then the MN is deemed to accept the configuration information of the IDC assistance information.

Optionally, the IDC assistance information includes at least one of IDC assistance information of the MCG and IDC assistance information of the SCG; the assistance configuration information of IDC interference cancellation sent to the user terminal includes at least one of assistance configuration information of IDC interference cancellation of the MCG and assistance configuration information of IDC interference cancellation of the SCG.

The transceiver 1602 is used for receiving and transmitting data under a control of the processor 1601, the transceiver 1602 includes at least two antenna ports.

In FIG. 16, the bus architecture may include any number of interconnected buses and bridges, specifically various circuits such as one or more processors represented by the processor 1601 and a memory represented by the storage 1603 are linked together. The bus architecture may also link together various other circuits, such as peripheral devices, voltage regulators, and power management circuits, which are well known in the art, and thus will not be described further herein. The bus interface provides an interface. The transceiver 1602 may be a plurality of elements, i.e., including a transmitter and a receiver, for providing elements for communicating with various other devices over a transmission medium. For different user devices, the user interface 1604 may also be an interface capable of externally or internally interfacing with a desired device, including, but not limited to, a keypad, a display, a speaker, a microphone, a joystick, etc.

The processor 1601 is responsible for managing the bus architecture and general processing, and the storage 1603 may store data used by the processor 1601 when performing operations.

Optionally, the embodiments of the present disclosure also provide an MN. The MN includes a processor 1601, a storage 1603, a computer program stored on the storage 1603 and executable by the processor 1601, wherein when the computer program is executed by the processor 1601, the processor 1601 implements each process of the above-described embodiment of the method of transmitting configuration information, and the same technical effect can be achieved. Description thereof is not described herein in order to avoid repetition.

Figure 17:
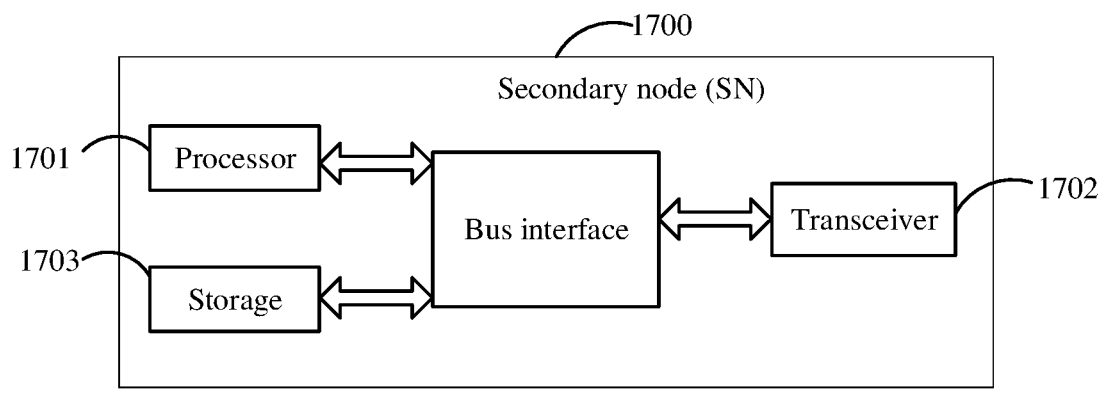
FIG. 17 is a structural diagram of another SN provided by some embodiments of the present disclosure.

Referring to FIG. 17, FIG. 17 is a structural diagram of another SN provided by some embodiments of the present disclosure. As shown in FIG. 17, the SN 1700 includes a processor 1701, a transceiver 1702, a storage 1703, and a bus interface, wherein, the transceiver 1702 is used for obtaining IDC assistance information of a user terminal; sending assistance configuration information of IDC interference cancellation to the user terminal or the MN, wherein the assistance configuration information of IDC interference cancellation corresponds to the IDC assistance information.

Optionally, before obtaining the IDC assistance information of the user terminal, the transceiver 1702 is further used for: determining configuration information of the IDC assistance information by transmitting a signaling between the MN and the SN, wherein, the configuration information of the IDC assistance information includes at least one of a measurement object identifier, a measurement configuration identifier, a measurement identifier, and report indication information for indicating whether the user terminal is allowed to report the IDC assistance information.

Optionally, the configuration information of the IDC assistance information is sent by the MN to the SN, and the SN sends or does not send a feedback message to the MN; the feedback message is used to indicate whether to accept the configuration information of the IDC assistance information, wherein if the SN does not send the feedback message, then the SN is deemed to accept the configuration information of the IDC assistance information; or the configuration information of the IDC assistance information is sent by the SN to the MN, and the MN sends or does not send a feedback message to the SN, wherein the feedback message is used to indicate whether to accept the configuration information of the IDC assistance information, wherein if the MN does not send the feedback message, then the MN is deemed to accept the configuration information of the IDC assistance information.

Optionally, the IDC assistance information includes at least one of IDC assistance information of the MCG and IDC assistance information of the SCG; the assistance configuration information of IDC interference cancellation includes at least one of assistance configuration information of IDC interference cancellation of the MCG and assistance configuration information of IDC interference cancellation of the SCG.

The above SN can reduce IDC interference at the user terminal.

The transceiver 1702 is used for receiving and transmitting data under a control of the processor 1701, the transceiver 1702 includes at least two antenna ports.

In FIG. 17, the bus architecture may include any number of interconnected buses and bridges, specifically various circuits such as one or more processors represented by the processor 1701 and a memory represented by the storage 1703 are linked together. The bus architecture may also link together various other circuits, such as peripheral devices, voltage regulators, and power management circuits, which are well known in the art, and thus will not be described further herein. The bus interface provides an interface. The transceiver 1702 may be a plurality of elements, i.e., including a transmitter and a receiver, for providing elements for communicating with various other devices over a transmission medium.

The processor 1701 is responsible for managing the bus architecture and general processing, and the storage 1703 may store data used by the processor 1701 when performing operations.

Optionally, the embodiments of the present disclosure also provide an SN. The SN includes a processor 1701, a storage 1703, a computer program stored on the storage 1703 and executable by the processor 1701, wherein when the computer program is executed by the processor 1701, the processor 1701 implements each process of the above-described embodiment of the method of transmitting configuration information, and the same technical effect can be achieved. Description thereof is not described herein in order to avoid repetition.

Some embodiments of the present disclosure further provide a computer-readable storage medium, on which a computer program is stored. When the computer program is executed by a processor, the processor implements various processes of the embodiments in the method of transmitting configuration information on a user terminal side; or when the computer program is executed by a processor, the processor implements various processes of the embodiments in the method of transmitting configuration information on an MN side; or, when the computer program is executed by a processor, the processor implements various processes of the embodiments in the method of transmitting configuration information on an SN side, and the same technical effect can be achieved, and description thereof will not be repeated here. The computer-readable storage medium is, for example, a Read-Only Memory (ROM), a Random Access Memory (RAM), a magnetic disk or an optical disk.

It should be noted that in this context, such terms as "include", "comprise", or any other variation thereof are intended to encompass non-exclusive inclusion, so that processes, methods, articles or devices including a series of elements include not only those elements but also other elements not explicitly listed, or may also include elements inherent to such processes, methods, articles, or devices. In absence of further limitations, an element after a statement "including one" do not exclude existence of another identical element in a process, a method, an article, or a device that includes the element.

From the above description of the embodiments, it will be apparent to those skilled in the art that methods in the above embodiments may be implemented by means of software plus a common necessary hardware platform, and of course may also be implemented by hardware, but in many cases the former is a better implementation. Based on such an understanding, an essential part or a part contributing the related art in technical solutions of the present disclosure may be embodied in a form of a software product. The computer software product is stored in a storage medium such as an ROM/RAM, a magnetic disk, an optical disk, and includes instructions for enabling a terminal (which may be a mobile phone, a computer, a server, an air conditioner, or a network device or the like) to perform the methods described in various embodiments of the present disclosure.

The embodiments of the present disclosure have been described above in conjunction with the accompanying drawings, but the present disclosure is not limited to the embodiments described above, which are merely illustrative and not limiting. A person of ordinary skill in the art, under the teachings of the present disclosure, may also make many form variations, without departing from the spirit of the present disclosure and the protection scope of the claims. The form variations are all within the protection scope of the present disclosure.

What is claimed is:

1. A method of transmitting configuration information, the method being applied to a user terminal, the method comprising:
   sending In-Device Coexistence (IDC) assistance information to a network-side device, wherein the network-side device comprises at least one of a master node (MN) or a secondary node (SN);
   receiving assistance configuration information of IDC interference cancellation sent by the network-side device, wherein the assistance configuration information of IDC interference cancellation corresponds to the IDC assistance information,
   wherein,
   a Signaling Radio Bearer (SRB) is not established between the user terminal and the SN;
      the network-side device is the MN, and the IDC assistance information comprises at least one of IDC assistance information of a Master Cell Group (MCG) or IDC assistance information of a Secondary Cell Group (SCG); the assistance configuration information comprises at least one of assistance configuration information of IDC interference cancellation of the MCG or assistance configuration information of IDC interference cancellation of the SCG;
   or,
   a Signaling Radio Bearer (SRB) is established between the user terminal and the SN;
      the IDC assistance information comprises IDC assistance information of a Secondary Cell Group (SCG), and the network-side device comprises the SN,
      sending the IDC assistance information to the network-side device comprises sending the IDC assistance information of the SCG to the SN through an SRB3 between the user terminal and the SN.

2. The method according to claim 1, further comprising: before sending the IDC assistance information to the network-side device,
   receiving a request message sent by the MN, wherein the request message is used to request the user terminal to report capability indication information;
   sending the capability indication information to the MN, the capability indication information being used to indicate whether the user terminal supports an IDC assistance function;
   receiving report indication information, wherein the report indication information is used to indicate whether the user terminal is allowed to report the IDC assistance information.

3. The method according to claim 2, wherein,
   if the SRB is not established between the user terminal and the SN, then the report indication information is sent by the MN, the report indication information is used to indicate whether at least one of the MCG or the SCG allows the user terminal to report the IDC assistance information;
   or,
   if the SRB is established between the user terminal and the SN, then the report indication information comprises at least one of first report indication information or second report indication information, wherein, the first report indication information is report indication information sent by the MN for indicating whether a Master Cell Group (MCG) allows the user terminal to report the IDC assistance information, and the second report indication information is report indication information sent by the SN for indicating whether the SCG allows the user terminal to report the IDC assistance information.

4. The method according to claim 1, wherein the IDC assistance information further comprises DC assistance information of a Master Cell Group (MCG), and the network-side device further comprises the MN,
   sending the IDC assistance information to the network-side device comprises sending the IDC assistance information of the MCG to the MN through SRB0, SRB1, or SRB2 between the user terminal and the MN.

5. A non-transitory computer readable storage medium, comprising:
   a computer program stored on the computer readable storage medium, wherein when a processor executes the computer program, the processor implements steps in the method of transmitting configuration information according to claim 1.

6. A method of transmitting configuration information, the method being applied to a Master Node (MN), the method comprising:
   receiving In-Device Coexistence (IDC) assistance information sent by a user terminal;
   sending assistance configuration information of IDC interference cancellation to the user terminal, wherein the assistance configuration information of IDC interference cancellation corresponds to the IDC assistance information,
   wherein, the IDC assistance information comprises at least one of IDC assistance information of a Master Cell Group (MCG) or IDC assistance information of a Secondary Cell Group (SCG);
   the assistance configuration information of IDC interference cancellation sent to the user terminal comprises at least one of assistance configuration information of IDC interference cancellation of the MCG or assistance configuration information of IDC interference cancellation of the SCG.

7. The method according to claim 6, further comprising: before receiving the IDC assistance information sent by the user terminal,
   sending a request message to the user terminal, wherein the request message is used to request the user terminal to report capability indication information;
   receiving capability indication information sent by the user terminal, wherein the capability indication information is used to indicate whether the user terminal supports an IDC assistance function;
   sending report indication information to the user terminal, wherein the report indication information is used to indicate whether at least one of the MCG and the SCG allows the user terminal to report IDC assistance information.

8. The method according to claim 7, further comprising: after receiving the capability indication information sent by the user terminal, before sending the report indication information to the user terminal,
- determining configuration information of the IDC assistance information by transmitting a signaling between the MN and a Secondary Node (SN), wherein, the configuration information of the IDC assistance information comprises at least one of a measurement object identifier, a measurement configuration identifier, a measurement identifier, and the report indication information.

9. The method according to claim 8, wherein the configuration information of the IDC assistance information is sent by the MN to the SN, the SN sends or does not send a feedback message to the MN, the feedback message is used to indicate whether to accept the configuration information of the IDC assistance information, wherein if the SN does not send the feedback message, then the SN is deemed to accept the configuration information of the IDC assistance information; or
- the configuration information of the IDC assistance information is sent by the SN to the MN, and the MN sends or does not send a feedback message to the SN, the feedback message is used to indicate whether to accept the configuration information of the IDC assistance information, wherein if the MN does not send the feedback message, then the MN is deemed to accept the configuration information of the DC assistance information.

10. A non-transitory computer readable storage medium, comprising:
- a computer program stored on the computer readable storage medium, wherein when a processor executes the computer program, the processor implements steps in the method of transmitting configuration information according to claim 6.

11. A method of transmitting configuration information, the method being applied to a Secondary Node (SN), the method comprising:
- obtaining In-Device Coexistence (IDC) assistance information of a user terminal;
- sending assistance configuration information of IDC interference cancellation to the user terminal or a Master Node (MN),
- wherein the assistance configuration information of IDC interference cancellation corresponds to the IDC assistance information,
- the IDC assistance information comprises IDC assistance information of a Secondary Cell Group (SCG);
- obtaining the IDC assistance information of the user terminal comprises obtaining the IDC assistance information of the SCG from the user terminal through a Signaling Radio Bearer 3 (SRB3) between the user terminal and the SN.

12. The method according to claim 11, further comprising: before obtaining the IDC assistance information of the user terminal,
- determining configuration information of the IDC assistance information by transmitting a signaling between the MN and the SN, wherein, the configuration information of the IDC assistance information comprises at least one of a measurement object identifier, a measurement configuration identifier, a measurement identifier, and report indication information for indicating whether the user terminal is allowed to report the IDC assistance information.

13. The method according to claim 12, wherein,
- the configuration information of the IDC assistance information is sent by the MN to the SN, the SN sends or does not send a feedback message to the MN, the feedback message is used to indicate whether to accept the configuration information of the IDC assistance information, wherein if the SN does not send the feedback message, then the SN is deemed to accept the configuration information of the IDC assistance information; or
- the configuration information of the IDC assistance information is sent by the SN to the MN, the MN sends or does not send a feedback message to the SN, the feedback message is used to indicate whether to accept the configuration information of the IDC assistance information, wherein if the MN does not send the feedback message, then the MN is deemed to accept the configuration information of the DC assistance information.

14. A non-transitory computer readable storage medium, comprising:
- a computer program stored on the computer readable storage medium, wherein when a processor executes the computer program, the processor implements steps in the method of transmitting configuration information according to claim 11.

* * * * *